(12) United States Patent
Koreeda et al.

(10) Patent No.: US 9,178,930 B2
(45) Date of Patent: Nov. 3, 2015

(54) CONTENT RECEIVING DEVICE, AND CONTENT DISTRIBUTION SYSTEM

(75) Inventors: Hiroyuki Koreeda, Fujisawa (JP); Ritsuko Kanazawa, Yokohama (JP)

(73) Assignee: HITACHI MAXELL, LTD., Osaka (JP)

( * ) Notice: Subject to any disclaimer, the term of this patent is extended or adjusted under 35 U.S.C. 154(b) by 352 days.

(21) Appl. No.: 13/642,582

(22) PCT Filed: Aug. 30, 2010

(86) PCT No.: PCT/JP2010/064714
§ 371 (c)(1),
(2), (4) Date: Feb. 1, 2013

(87) PCT Pub. No.: WO2011/132333
PCT Pub. Date: Oct. 27, 2011

(65) Prior Publication Data
US 2013/0144981 A1    Jun. 6, 2013

(30) Foreign Application Priority Data
Apr. 23, 2010  (JP) .................................. 2010-099384

(51) Int. Cl.
*G06F 15/16* (2006.01)
*H04L 29/08* (2006.01)
(Continued)

(52) U.S. Cl.
CPC ................. *H04L 67/02* (2013.01); *G06Q 10/00* (2013.01); *G06Q 50/184* (2013.01)

(58) Field of Classification Search
CPC ............ H04L 2209/60; H04L 65/4084; H04L 2012/2849; H04L 2463/101; H04L 63/0853; H04L 29/08072; H04L 29/06
See application file for complete search history.

(56) References Cited

U.S. PATENT DOCUMENTS 6,772,133 B1   8/2004  Kambayashi et al.
8,386,390 B2 * 2/2013  Oho et al. ........................ 705/59
(Continued)

FOREIGN PATENT DOCUMENTS

CN   1399469 A   2/2003
CN   1514982 A   7/2004
(Continued)

OTHER PUBLICATIONS

JP Office Action for Japanese Application No. 2012-511511, issued on Dec. 17, 2013.
(Continued)

*Primary Examiner* — Razu Miah
(74) *Attorney, Agent, or Firm* — Baker Botts L.L.P.

(57) ABSTRACT

A content receiver comprises: an acceptance unit for accepting a designation of a recording medium to which contents are to be output; a license information acquiring unit for acquiring output license information describing the output requirements of the contents; and an output unit for outputting the contents to the designated recording medium. The output license information includes usage time limit information indicating the time limit of using the contents in an output destination. The output unit acquires the usage time limit information from the output license information for the contents, and sets the acquired usage time limit information to a management information storing area in the designated recording medium, thereby managing the time period of using the contents in the recording medium even if the copyright protection of the recording medium, which is an export destination, has a function to manage the time period of using the contents.

8 Claims, 28 Drawing Sheets

(51) Int. Cl.
*G06Q 10/00* (2012.01)
*G06Q 50/18* (2012.01)

(56) References Cited

U.S. PATENT DOCUMENTS

| | | | |
|---|---|---|---|
| 2002/0065918 A1* | 5/2002 | Shastri | 709/226 |
| 2002/0188659 A1* | 12/2002 | Ohashi et al. | 709/201 |
| 2002/0198958 A1* | 12/2002 | Frenkiel et al. | 709/217 |
| 2003/0033384 A1* | 2/2003 | Nishizawa et al. | 709/219 |
| 2003/0140009 A1 | 7/2003 | Namba et al. | |
| 2003/0188005 A1* | 10/2003 | Yoneda et al. | 709/231 |
| 2003/0233426 A1* | 12/2003 | Suzuki | 709/219 |
| 2004/0010588 A1* | 1/2004 | Slater et al. | 709/224 |
| 2004/0030656 A1* | 2/2004 | Kambayashi et al. | 705/59 |
| 2004/0102987 A1 | 5/2004 | Takahashi et al. | |
| 2004/0105544 A1* | 6/2004 | Haneda et al. | 380/231 |
| 2005/0010674 A1* | 1/2005 | Taniguchi et al. | 709/231 |
| 2005/0182931 A1* | 8/2005 | Robert et al. | 713/168 |
| 2006/0242152 A1* | 10/2006 | Tanaka et al. | 707/10 |
| 2007/0100767 A1* | 5/2007 | Kim | 705/59 |
| 2007/0150967 A1* | 6/2007 | Takahashi | 726/31 |
| 2007/0201511 A1* | 8/2007 | Saito et al. | 370/466 |
| 2008/0072046 A1* | 3/2008 | Ayaki et al. | 713/171 |
| 2008/0229094 A1* | 9/2008 | Moon et al. | 713/150 |
| 2008/0292103 A1* | 11/2008 | Lee et al. | 380/277 |
| 2009/0125949 A1* | 5/2009 | Kimura | 725/59 |
| 2009/0144400 A1* | 6/2009 | Kunito | 709/220 |
| 2009/0232476 A1* | 9/2009 | Matsubayashi | 386/94 |
| 2010/0274889 A1* | 10/2010 | Carter et al. | 709/224 |

FOREIGN PATENT DOCUMENTS

| | | |
|---|---|---|
| EP | 1280292 A2 | 1/2003 |
| EP | 1 406 175 | 4/2004 |
| EP | 1998268 A1 | 12/2008 |
| JP | 2000-99010 | 4/2000 |
| JP | 2000-260121 | 9/2000 |
| JP | 2006-309589 | 11/2006 |
| JP | 2008-210504 | 9/2008 |
| JP | 2009-245578 | 10/2009 |
| JP | 2011-097383 | 5/2011 |
| JP | 2011-229092 | 11/2011 |

OTHER PUBLICATIONS

European Search Report for EP Application No. 10850274.1, issued on Nov. 20, 2014.
Extended European Search Report, mailed Feb. 20, 2015, which issued during the prosecution of European Patent Application No. 10826424.3, which corresponds to the present application.
Office Action, mailed Mar. 26, 2015, which issued during the prosecution of Chinese Patent Application No. 201080066376.2, which corresponds to the present application (partial translation attached).
DVB Organization: "CM1063 CPCM Content Management Scenarios.docx," DVB, Digital Video Broadcasting, c/o EBU—17A Ancienne Route—Ch-1218 Grand Saconnex, Geneva—Switzerland, Jun. 23, 2009, XP017824834.
DVB Organization: TM-CPT1399R0 CPCM Content and AD management scenarios.doc, DVB, Digital Video Broadcasting, c/o EBU—17A Ancienne Route—CH-1218 Grand Sacconex, Geneva—Switzerland, May 24, 2007, XP017807012.
DVB Organization: "ts_10282502v010101p.doc," DVB, Digital Video Broadcasting, c/o EBU—17A Ancienne Route—CH-1218 Grand Saconnex, Geneva—Switzerland, Sep. 8, 2009, XP017807371.
DVB Organization: "TM-CPT1448 Comparison of DLNA use cases and CPCM functionalityr3.doc," DVB, Digital Video Broadcasting, c/o EBU—17A Ancienne Route—CH-1218 Grand Saconnex, Geneva—Switzerland, Nov. 8, 2007, XP017807267.

* cited by examiner

EXPORT LICENSE HOLD BUFFER

| LICENSE ID | EXPORT LICENSE DATA | NUMBER PIECES OF HOLD |
|---|---|---|
| 9087611 | CRYPTOGRAPHIC KEY, USAGE CONDITION ··· | 1 |
| 0982006 | CRYPTOGRAPHIC KEY, USAGE CONDITION ··· | 4 |
| 123450 | CRYPTOGRAPHIC KEY, USAGE CONDITION ··· | 2 |
| ⋮ | | ⋮ |

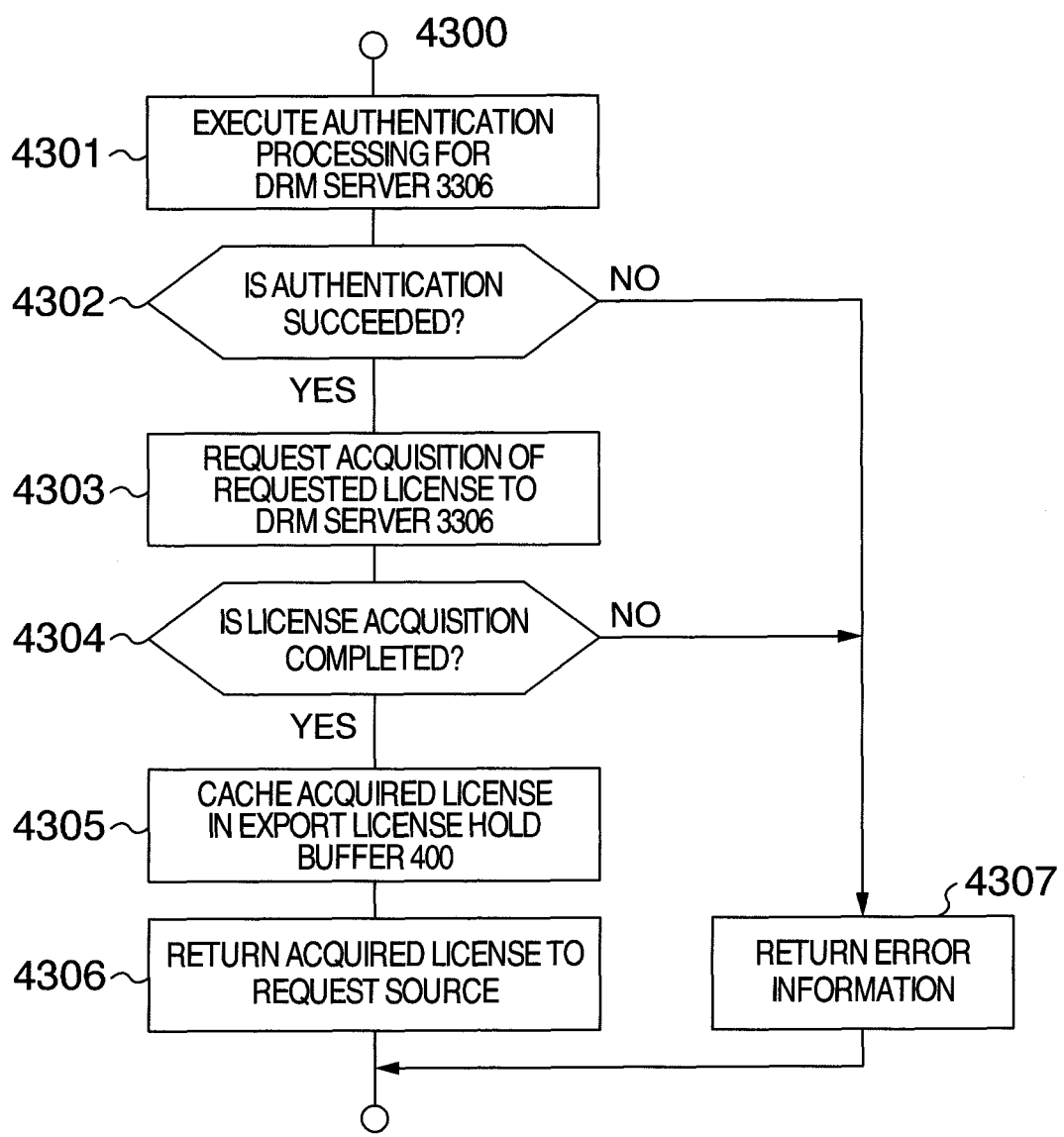

FIG. 33

| No. | SORT | | CONTENT | PRECONDITION |
|---|---|---|---|---|
| 1 | SIMPLICITY EXPORT | | CONTENT OF EXPORT ALLOWABLE TIMES STATED BY PURCHASE AGREEMENT IS OUTPUT TO REMOVAL MEDIUM OR EXTERNAL INTERFACE TO MAKE COPY | CONTENT CAN BE COPIED TO ONLY EXPORT DESTINATION PERMITTED IN DRM WHEN EXPORTING CONTENT PROTECTED BY DRM |
| 2 | EXTENDED EXPORT | EXPORT APPENDED WITH COPY TIMES | ARBITRARY PLURAL TIMES WITHIN EXPORT ALLOWABLE TIMES STATED BY PURCHASE AGREEMENT IS APPENDED, AS COPY TIMES MANAGEMENT INFORMATION, TO AN ACTUAL CONTENT TO EXECUTE EXPORT OUTPUT | EXPORT CAN BE EXECUTED WHEN EXPORT DESTINATION MEDIUM ETC. HAS COPYRIGHT PROTECTION FUNCTION TO BE ABLE TO EXECUTE COPY TIMES MANAGEMENT |
| 3 | | EXPORT APPENDED WITH USAGE TIME LIMIT | TIME LIMIT INFORMATION OF EXPORT DESTINATION CONTENT STATED BY PURCHASE AGREEMENT IS APPENDED TO CONTENT AS TIME LIMIT MANAGEMENT INFORMATION | EXPORT CAN BE EXECUTED WHEN EXPORT DESTINATION MEDIUM ETC. HAS COPYRIGHT PROTECTION FUNCTION TO BE ABLE TO EXECUTE TIME LIMIT MANAGEMENT SUCH AS USAGE START TIME LIMIT, USAGE END TIME LIMIT, ETC. |

CONTENT RECEIVING DEVICE, AND CONTENT DISTRIBUTION SYSTEM

INCORPORATION BY REFERENCE

The present application claims priority from Japanese Patent Application No. 2010-099384 filed on Apr. 23, 2010, the contents of which are hereby incorporated by reference into this application.

TECHNICAL FIELD

The technical field relates to a copyright management function of a content receiver apparatus when using services for delivering contents of music and video via Internet, digital broadcastings, etc.

BACKGROUND ART

In late years, a content delivery service has been commercialized for delivering various digital contents, such as music, video, etc., and a content copyright management function has increased in importance for restricting playback times for the digital contents accumulated in home receivers, a transfer of the contents, a copy (or dubbing) of DVD-RAM, SD card, etc. to an external storage medium, from the point of view of a copyright protection and user's convenience.

If there is no restriction for copy times, the right for owner of copyright is not protected since an external storage medium storing the contents can be produced unrestrictedly. In contrast, there are needs to copy it to the external storage medium from the point of view of convenience when a user, who bought the contents, uses it in a car or outdoors within individual activity. Further, an inconvenience sometimes occurs such that the contents, which were bought, are all lost since a storage device in the receiver is broken down, therefore, a backup is insignificant.

For example, a music delivery system in which the copyright protection is executed in Patent literature 1 is configured by a server for executing a music content delivery, a charge settlement, etc., a user terminal for executing a procedure of purchasing the contents by accessing to the server from the user, an exclusive-use playback device for playing back purchased music, etc. The user accesses to the server from the user terminal via a network to purchase digital music data (AV contents) and a ticket capable of copying the music data plural times.

The music data and copy ticket is downloaded once to the user terminal from the server to further store the copy ticket in the exclusive-use playback device from the user terminal. The music data is also copied to the exclusive-use playback device. At this time, a number or numbers are subtracted from the number of copy ticket, and a copy history in the exclusive-use playback device is updated. The copy history of exclusive-use playback device is notified to the server when the exclusive-use playback device is coupled to the user terminal and the user terminal is also coupled to the server. In consequence of this configuration, it realizes that the copy can be executed and the system executes the copyright protection.

Patent Literature 2 discloses a content use system, in which a receiving terminal executes to purchase digital contents from a content delivery server to download, play back and export it, provides that a license appended to the digital contents is divided into a playback license and an export license to be managed as those, the playback license is can be duplicated in a predetermined range, and the export license is not allowed to duplicate it in the predetermined range, but allowed to move only, in consequence, a strict export control can be executed without recourse of export processing times.

CITATION LIST

Patent Literature

Patent Literature 1: JP-A-2000-99010
Patent Literature 2: JP-A-2006-309589

SUMMARY OF INVENTION

Technical Problem

A recorder has a function of executing the copyright management. Even though the recorder has a function of executing a copy appended with a copy restricted times to an external storage medium capable of managing another copyright, contents appended with the copy restricted times cannot be copied to other medium from the recorder. It was configured that either contents, copied as ten different contents of disallowable copy, is moved only to other medium.

However, from user's point of view, when the contents appended with ten pieces of export license is purchased and downloaded to a hard disk in a TV set, the user often wants to have a method used for copying the contents appended with the right of ten dubbings (capable of copy of nine times+move of once) to the recorder and further copying it to other medium, such as SD card etc. from the recorder.

Even when a copyright protection of an export destination medium is related to a function of managing a usage time period for the contents, the usage time period for the contents in the medium was not managed by using the export license.

Solution to Problem

A content receiver apparatus is characterized in that, when an export destination device and medium can manage the copy times in exporting the contents, the user is designated to set copy allowable times to be appended to export targeted contents, a processing is executed for consuming the export license of the designated copy allowable times from a copyright management server and own device, and the content data is exported together with export license information of the designated times in accordance with a copyright management system of the export destination.

Alternatively, the content receiver apparatus provides an acceptance unit that accepts a designation of a recording medium to output contents, a license information acquiring unit that acquires output license information describing output requirements of the contents, and an output unit that outputs the contents to the designated recording medium, wherein the output license information has usage time limit information designating a usage time limit of the contents in an output destination, and the output unit acquires the usage time limit information from the output license information for the contents to set the acquired usage time limit information in a management information storing area of the designated recording medium.

Advantageous Effects of Invention

When the contents are exported from a receiver device, information for managing the copyright can be set in the export destination medium.

For example, the export license is exported as copy allowable times while holding the right of copyright owner in the restriction of the copy allowable times, so that the convenience for the user can be improved.

For example, the user checks expressly the usage time period for the contents to be able to use, on the basis of metadata, when exporting the contents appended with a condition of the usage time period to the medium.

The other objects, features and advantages of the invention will become apparent from the following description of the embodiments of the invention taken in conjunction with the accompanying drawings.

BRIEF DESCRIPTION OF DRAWINGS

FIG. 13 is a data description example of a license hold buffer, FIG. 32 is a processing flow example of DRM client, and FIG. 33 is an example of a list showing types of the export processing.

DESCRIPTION OF EMBODIMENTS

Figure 1:
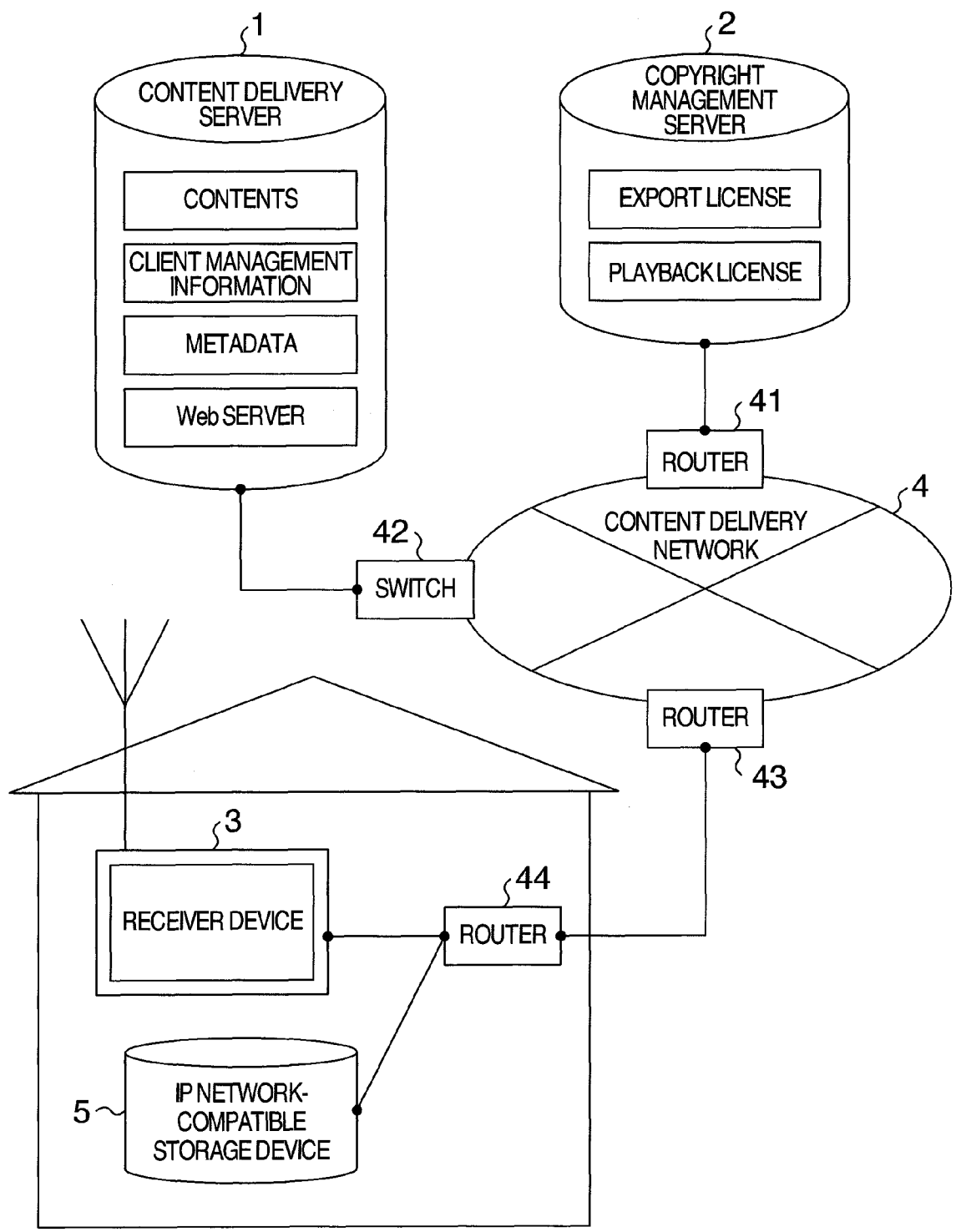
FIG. 1 is a diagram showing a system configuration example of a service server for providing a contents delivery service to a network-compatible home electrical appliance via a network.

A copyright management is represented by the following model in a delivery service system. First, contents requested for a delivery by a user are downloaded from a delivery server of a service business provider with a format of an encrypted content file to be accumulated in a receiver device, such as a TV set, AV recorder, PC incorporated with an AV player function, etc., provided in the user's home. The user acquires, from a separate copyright management server, a watching/listening license configured by a usage condition information containing a content key encrypted with the downloaded contents and a time period to be able to watch/listen to the contents, and the encrypted contents are decrypted by using the content key to be played back and watched/listened by the AV player.

When the downloaded contents accumulated in the receiver device are output for copying and moving (move) to a removable medium, such as DVD-RAM, SD card, etc. and also output (hereinafter, referred to as export) to an external interface of a network etc., a license for an export configured by the content key and the usage condition information for the medium to be allowed to execute a dubbing is acquired to be copied or moved to an external storage medium.

The time period to be able to watch/listen to the contents and the export times, defined as a license, are different depending on a purchase condition of the contents, and the user uses the contents within a corresponding restriction by such that the receiver device executes a playback, move, copy, externally IF output, etc. for the contents in accordance with the condition written in the license.

The above-mentioned description is made for embodiments, however, the invention is not limited to the description. It is apparent that various changes and modifications may be made by those skilled in the art from the spirit of the invention and the scope of the appended claims.

Embodiment 1

Number of export or the copy and move allowable times corresponds to a total number of contents for which the user can possess, and when the contents appended with N pieces of the export license is downloaded to an accumulation medium via the network from a content delivery server, copy of (N-1) times and move of once can be executed from one accumulation medium to the other. An acquisition timing of license information to be used for the export corresponds to a time point when executing the export, and one export license is consumed at a time point when even part of the contents can be watched/listened by the medium or device in an export destination.

For this reason, it is essential that the content copy of once and one export license consumption processing must be executed as one set when the contents purchased by the user is exported in the content delivery service, and even in the copyright management server for executing a license management in the service business provider, a management assuming that the export license is consumed at every processing is executed.

To this end, for example, even though the contents appended with the ten pieces of export license are purchased to be downloaded to a user's TV set capable of managing the copyright of the user from the sewer, the copy of nine times and move of once are only executed to the recorder as contents of ten individual pieces of disallowable copy, in the case of configuration where the TV set is coupled with only one recorder.

In fact, even though the recorder has a function of executing the copyright management and also has a function of executing the copy appended with the restricted times of copy to the external storage medium capable of another copyright management, the recorder cannot copy to the separate medium. It was configured that either contents, copied as individual ten pieces of the contents of disallowable copy, is only moved to the other medium.

However, from user's point of view of convenience, when the contents appended with ten pieces of export license is purchased to be downloaded to a hard disk in the TV set, the user often wants to use a method of copying the contents appended with the right of ten dubbings (capable of copying nine times+moving once) to the recorder and further copying it from the recorder to the other media, such as SD card etc.

FIG. 1 is a diagram showing a device configuration example of a content delivery service system.

A receiving device 3 as a user terminal for using a content delivery service is coupled to a content delivery server 1 and a copyright management server 2 to be operated by a service providing business provider, via a content delivery network 4. The receiver device 3 executes a content purchase procedure to download desired contents, play back and dub the contents in an allowable range of the copyright appended to the contents.

The content delivery server 1 is a server having: a Web server function for providing a portal site which becomes a user interface for executing various procedures when the user uses a content download service; a file server function for transferring AV contents accumulated with a data file format, as an IP data packet format, in response to a request from the receiver device 3; a function for accumulating and delivering a download control metafile written with control information necessary for when the user downloads video content data to the receiving device, etc.

The copyright management server 2 is a server coordinated with the content delivery server 1 to execute generation, management and issuance of the license for every content.

The receiving device 3 is a client terminal of the user, incorporated with a function for using the content delivery service, for example, a TV set having a recording function, recorder, personal computer, etc. to be coupled with the network. In this embodiment, the receiver device 3 has a data transmission and reception function via IP network. Further, the receiver device 3 includes a network-compatible digital TV set providing a reading and writing drive for a removable medium, such as a removable hard disk iVDR (Information Versatile Disk for Removable usage), optical disk BD/DVD (Blu-ray disc/Digital Versatile Disk), SD card (Secure Digital Memory Card), etc.

The content delivery network 4 includes Internet protocol communication network realized by using either various-past-network physical layers (including light, wire or wireless network), and also includes communication control devices 41 to 44 for transmitting data packets from a transmission source to a transmission destination, such as a router, switch, hub, etc.

In addition, in FIG. 1 as an example, the server and home network are coupled with a content delivery exclusive-use network through the switch and router, and the receiver device etc. is coupled with the home network. However, any types of communication network may be acceptable if the server is communicable with the receiver by the IP protocol.

A network-compatible storage device 5 is a mass-storage device to be able to transmit and receive data between the receiver device 3 and home network, and is set to NAS (Network Attached Storage) providing a function for transmitting and receiving digital media via the network in accordance with DLNA standards in this embodiment.

Figure 2:
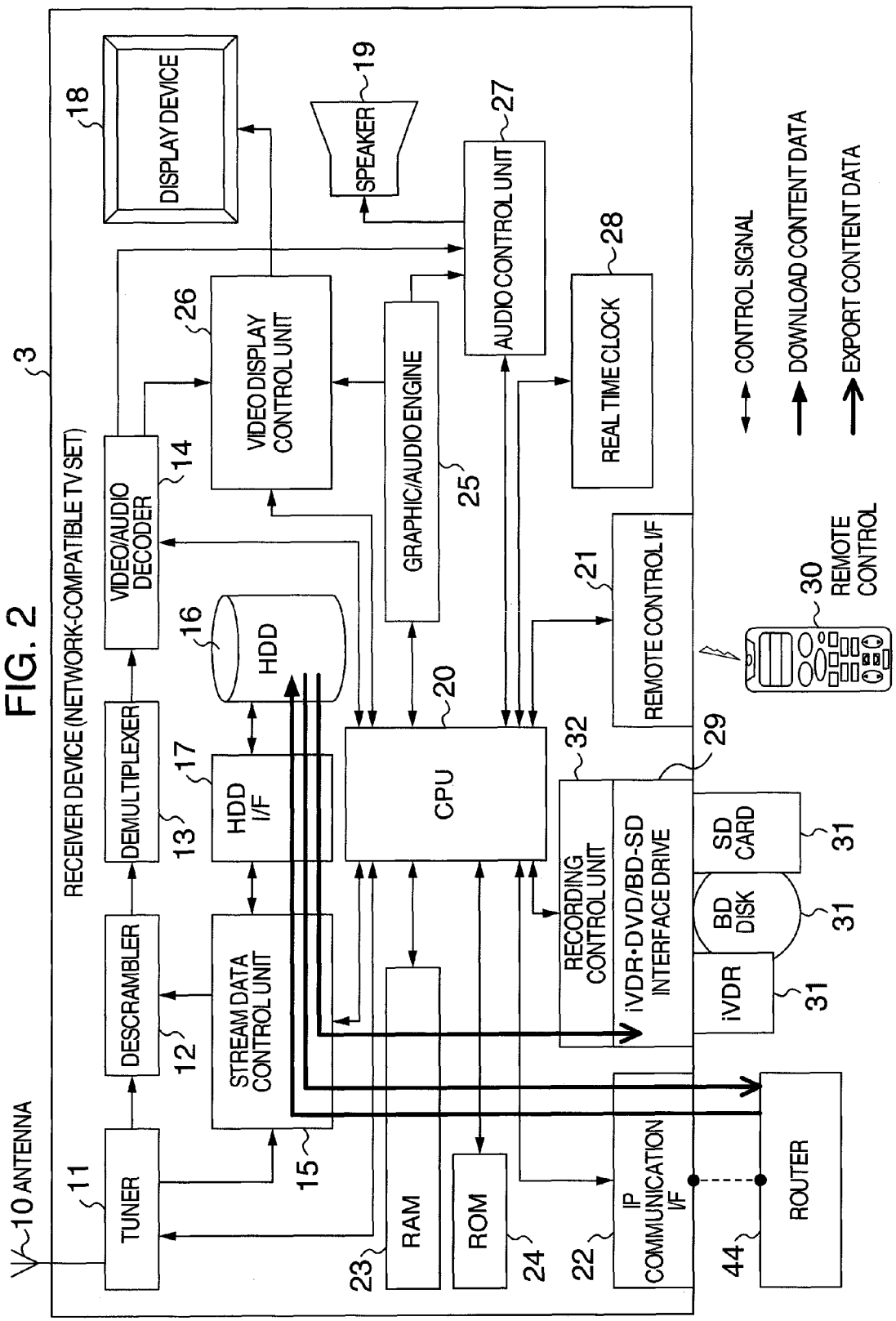
FIG. 2 is a diagram showing the system configuration of an IP TV set as an example of a receiver device and an example of a content data flow.

FIG. 2 is a hardware configuration diagram showing a network-compatible TV set of receiver device 3. The receiver device 3 provides IP communication port 22 for transmitting and receiving IP (Internet Protocol) data packets, other than an antenna received broadcasting radio waves and a digital tuner to be able to execute a processing of the various IP communication protocol, such as TCP (Transmission Control Protocol), UDP (User Datagram Protocol), DHCP (Dynamic Host Configuration Protocol), DNS (Domain Name Server), HTTP (Hyper Text Transfer Protocol), etc.

The receiver device 3 incorporates applications such as DLNA function, HTTP browser, etc. to access to a Web site, by using HTTP browser, of the content delivery server 1 existing in the content delivery network 4 in the home. By using the streaming of contents and the download service, the contents downloaded by using this service are played back by another home device having DLNA function, conversely, the contents in the another home device can be transferred to own device.

In addition, in the receiver device 3, CPU 20 implements various processes by executing an authentication processing program, contents acquisition processing program, content management program, export processing program, license information acquiring program, etc., stored in ROM 24. Further, the receiver device 3 has a real time clock 28 to always hold an actual time and be able to be referred from the above-mentioned programs, and also has a timer function for making execute the program in CPU 20 at a setting date and time. In addition, the programs can be incorporated respectively into an integrated circuit as an independent hardware, such as an authentication processing unit, content acquisition processing unit, content management unit, export processing unit, license information acquiring unit, etc.

The receiver device 3 provides a mass-storage hard disk (HDD) 16 to be able to execute the read and write processing for numerous contents data.

For the sake of simplicity for the following description, the respective processes realized by executing the programs in CPU 20 will be described mainly as a processing unit for realizing the program. In addition, in the case of realizing the processing unit by the hardware, the processing unit executes mainly that processing.

As shown in FIG. 2 illustrating data flows, a stream data control unit 15 stores a content data file received as IP packets and a broadcast video recording data file received as a broadcast wave in the HDD 16. Thereafter, the stream data control unit 15 executes an export so as to write into a removable medium 31 such as iVDR, BD/DVD, SD card, etc. from iVDR/DVD/BD/SD interface drive 29 (removable medium drive 29) in response to a request from the user, and output from the IP communication interface 22 (IP port 22) to upload to the network-compatible storage device 5 via the home network, etc. The receiver device 3 has a recording control unit 32 for controlling the removable medium drive 29 when writing in and reading out from the removable medium 31. The removable medium (carriageable medium) is sometimes referred to as a recording medium. The recording control unit 32 is sometimes referred to as an output unit 32.

In addition, the network-compatible TV set in this embodiment can execute to play back, watch and listen to a broadcast, as well as the contents delivered through the IP network, without distinction, since the TV set has a descrambler 12 and a demultiplexer 13 to execute a data conversion so as to be able to implement a similar decode processing to the broadcast wave and then send it to a decoder 14.

A procedure for using a content download service by using the receiver device 3 is as follows, for example.

First, the user accesses to the Web server function of the content delivery server 1 by using the Web browser in the receiver device 3. The authentication processing unit in the receiver device 3 executes an authentication of ID of the receiver device (or user) for the content delivery server 1. After succeeding the authentication, the receiver device 3 acquires a Web site page for the download service on the content delivery server 1. The content acquisition processing unit in the receiver device 3 executes a purchase processing of a purchase package in the contents to be downloaded, desired from the user by using the Web page.

The purchase processing sends ID of the corresponding purchase package (contents) and ID of the receiver device (or user) to a charge server for a client management to charge first. The charge is completed to transfer the contents, a playback control metafile and a content guide metafile to the receiver device 3 from the content delivery server 1. The content acquisition processing unit in the receiver device 3 receives these pieces of transferred information to accumulate in the HDD 16.

Figure 3:
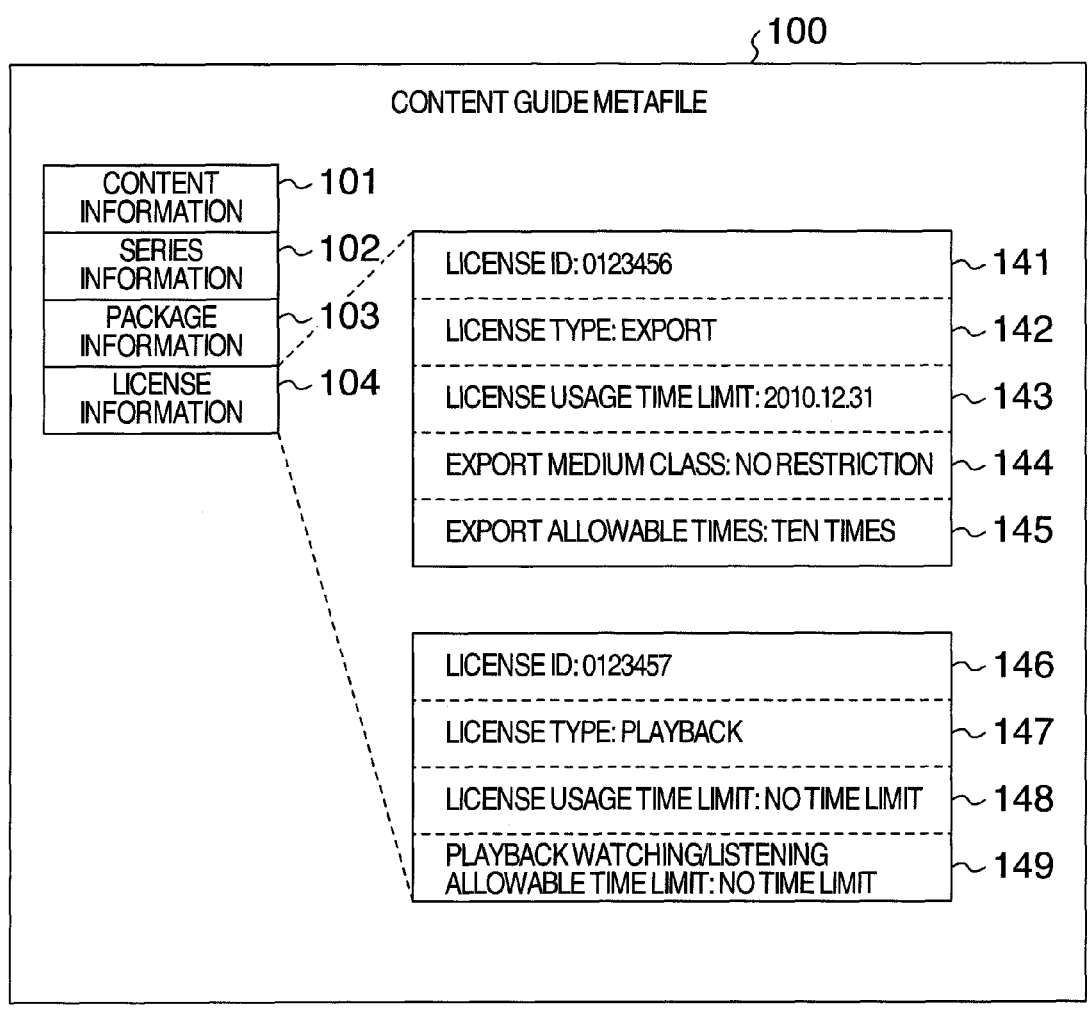
FIG. 3 is a configuration example of a content guide metafile.

The content guide metafile and playback control metafile to be accumulated together with the contents in the HDD 16 are required for when using the downloaded contents. FIG. 3 is a configuration example of the content guide metafile.

A content guide metafile 100 is a data file aggregated information required for a navigation in using the contents in such a way that the contents downloaded and accumulated in the receiving device are enumerated to display a list and designate a playback content to the user, when using the downloaded contents.

The content guide metafile is made up of: content metadata 101 (contents information 101) describing content information; series metadata 102 (series information 102) stating series information; package metadata 103 (package information 103) describing package information; and license metadata 104 (license information 104) describing license information.

The content metadata 101 is display information, such as a title of the contents, text of outline etc., thumbnail image, etc. and attribute information, such as category etc., which is used for displaying and controlling program information of a content unit.

The series metadata 102 is the display information, such as a title of series made up of plural contents, the text of outline etc., the thumbnail image, etc. and the attribute information of category etc., which is used for displaying and controlling the information of a series unit.

The package metadata 103 contains the attribute information, such as a package type (purchase for a single product, watching charge free for a year, etc.) of a charge unit when purchasing the contents and the attribute information of a charge etc., which is used for displaying and controlling the information.

The license metadata 104 contains the display information designating a right of usage appended to the contents, that is, designating a usage condition regarding the copyright and control information for acquiring the right of use from the copyright management server 2, which is used for displaying and controlling the information. The license metadata 104 is used together with the content metadata 101 to display information on one contents basis. However, plural number of right information is sometimes displayed by using plural metadata for one contents display in the case of appending plural numbers of the right of usage to the one contents.

The copyright management in this system is realized by the license information distributed to the receiver device from the copyright management server 2. The license information in this system is data required for allowing the use of contents in the case of only designating the right of usage and satisfying the usage condition. Specifically, the license information is data of the content key encrypted of the contents and usage condition information for using the contents. The license information exists on one contents basis. An acquisition of the license information is requested for the copyright management server 2 by using data of license acquiring information 220, and the license information is distributed to the receiver device from the copyright management server 2, when the license acquiring unit in the receiver device uses the contents.

In addition, the license information includes two types; playback license information and export license information since two types of the playback and export are provided as usage configuration of the contents in this system. In the above-mentioned license metadata 104, two pieces of right information are shown in FIG. 3 illustrating as reference numerals 141 to 149 in the case of appending both the export license and playback license to the contents.

The license acquired from the copyright management server 2 is identified uniquely by license ID 141, 146, and whether the export license or playback license is identified by a license type 142, 147.

A license usage time limit 143, 148 indicates a time limit to be able to acquire the license from the copyright management server 2.

The export license has an export media identification 144 and an export allowable times 145, and the playback license has information, such as a playback watching/listening allowable time limit 149 etc. The export media identification 144 designates an export allowable medium, and the export allowable times 145 designates the number of times to be able to export to the medium designated by the export medium identification 144.

Figure 4:
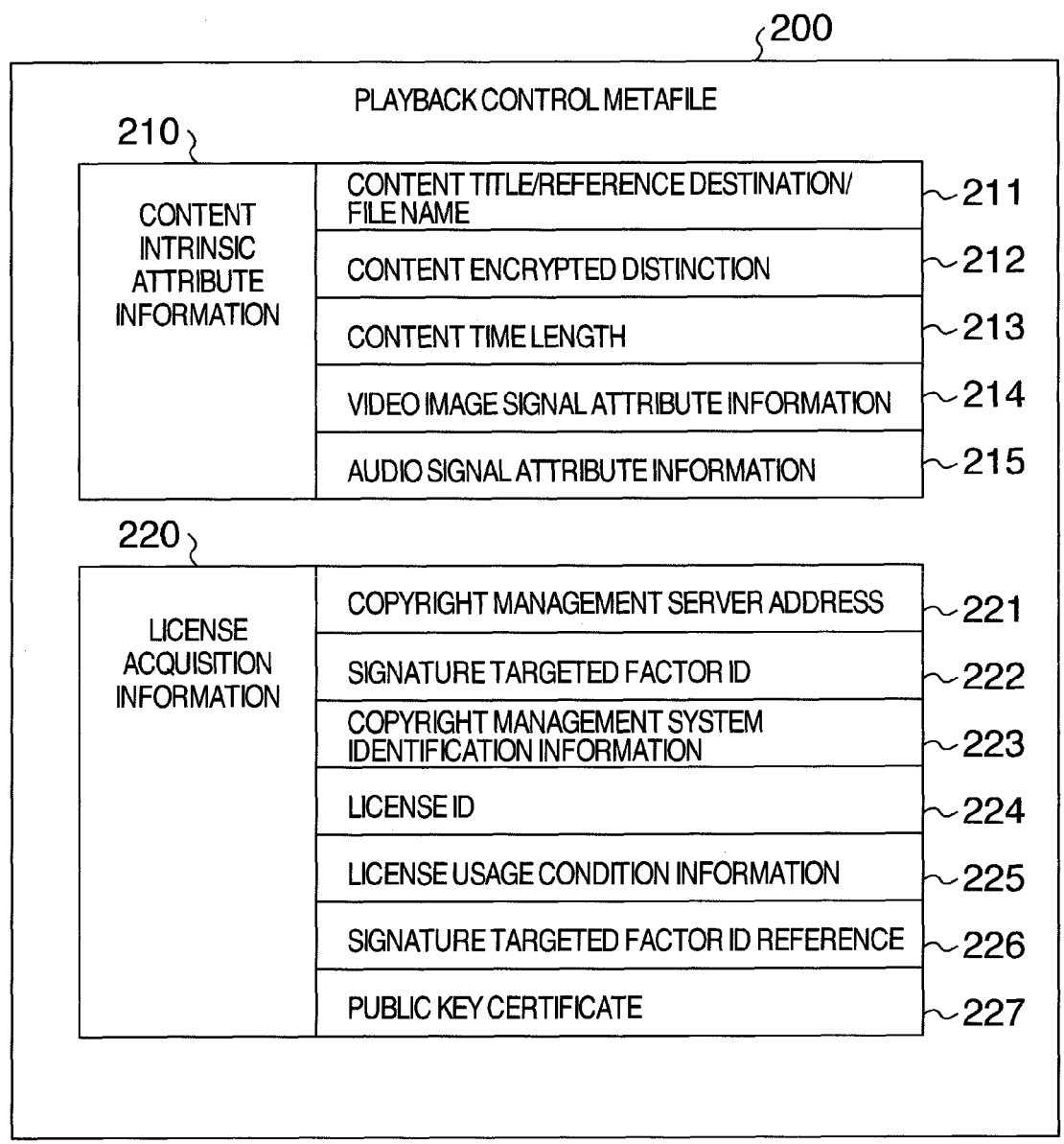
FIG. 4 is a configuration example of a playback control metafile.

FIG. 4 shows a configuration example of a playback control metafile.

A playback control metafile 200 is XML document described with data used for when the contents are actually played back or exported, after user navigation is executed by the content guide metafile.

The playback control metafile contains two XML documents of; a content intrinsic attribute information 210 as information of the AV stream for the content itself required for when playing back the contents and license acquiring information 220 required for when accessing to the copyright management server to acquire the content key etc. for the decode so that the cipher of encrypted contents is decrypted.

The content intrinsic attribute information 210 provides a file name and reference destination of a content body file, a time length of the contents, discrimination information designating whether the contents are encrypted, attribution information of a video signal, such as a video coding system, resolution/scanning/aspect ratio, etc., attribution information of an audio signal, such as discrimination for stereo/ monaural/multichannel.

The license acquiring information 220 of the contents provides information, such as copyright management server address information as designated a license acquiring destination of the targeted contents, class information of the copyright management system, a license ID indicating a class of the copyright protection range appended to the contents, a factor value of a signature target for executing a server authentication between the receiver devices or between the copyright management server and a client, a public key certificate required for a signature verification, etc.

Figure 5:
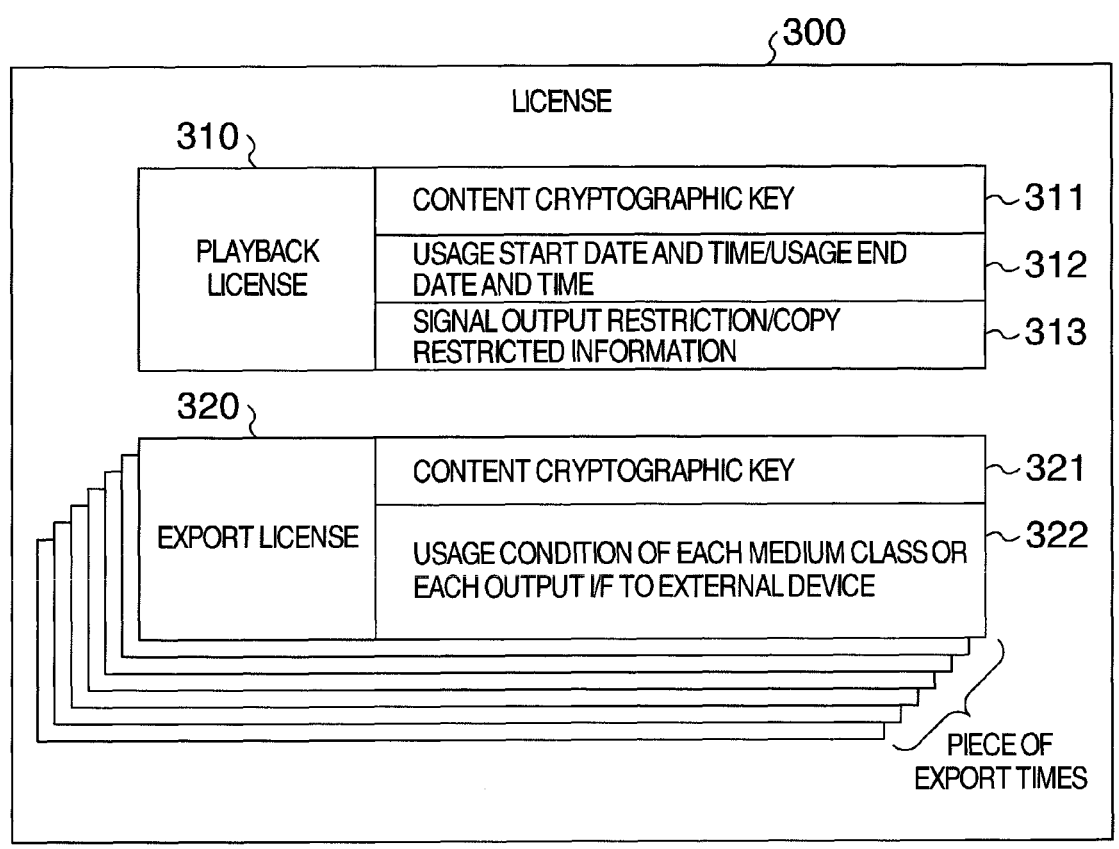
FIG. 5 is a data configuration example of a playback license and an export license.

FIG. 5 shows a data configuration example of the playback license and export license to be distributed to the receiver device from the copyright management server of the contents shown in FIG. 3 in this system. The playback license contains the content key encrypted of the contents, period information to be able to watch/listen to the contents, a copy prohibition and permission condition, etc. The export license contains the content key and information of the export allowable medium (DVD, memory card, etc.) or an output IF (output to IP network by using DTCP-IP protocol).

In the export license, N pieces of export license is appended to the contents of N times of allowable export since one license is consumed for the export of once.

Figure 6:
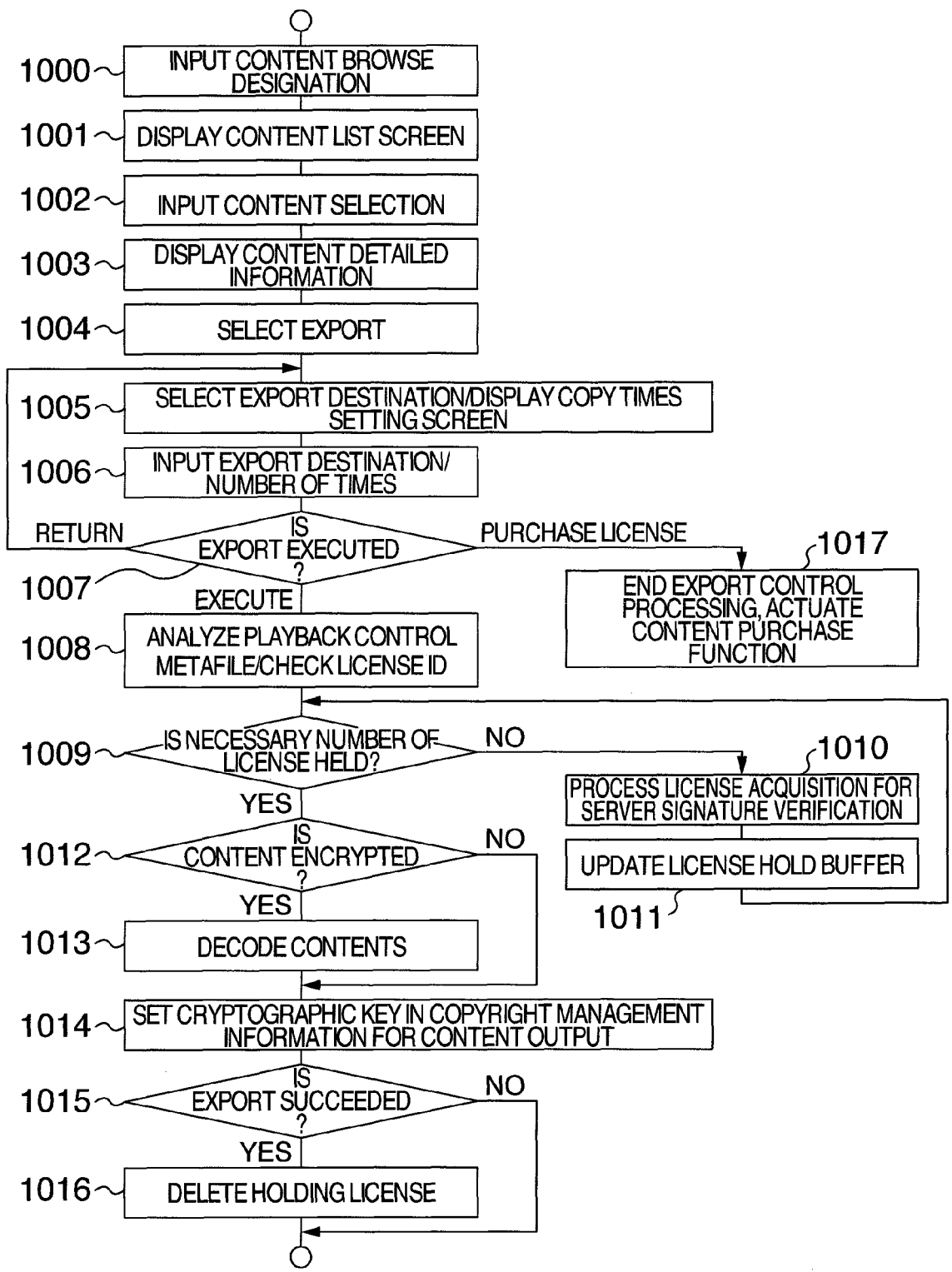
FIG. 6 is an example of processing flow of a content export function appended with copy times.

FIG. 6 is an example of a flowchart showing a processing of a content management unit and an export processing unit for executing the export appended with copy allowable times information of the receiver device 3 in the system.

For using the downloaded contents by the user, first, the user designates to browse the usable contents being downloaded in the receiver device 3 by the operation of a remote button. A remote control I/F 21 in the receiver device 3 receives a browsing designation from the user (step 1000).

Figure 7:
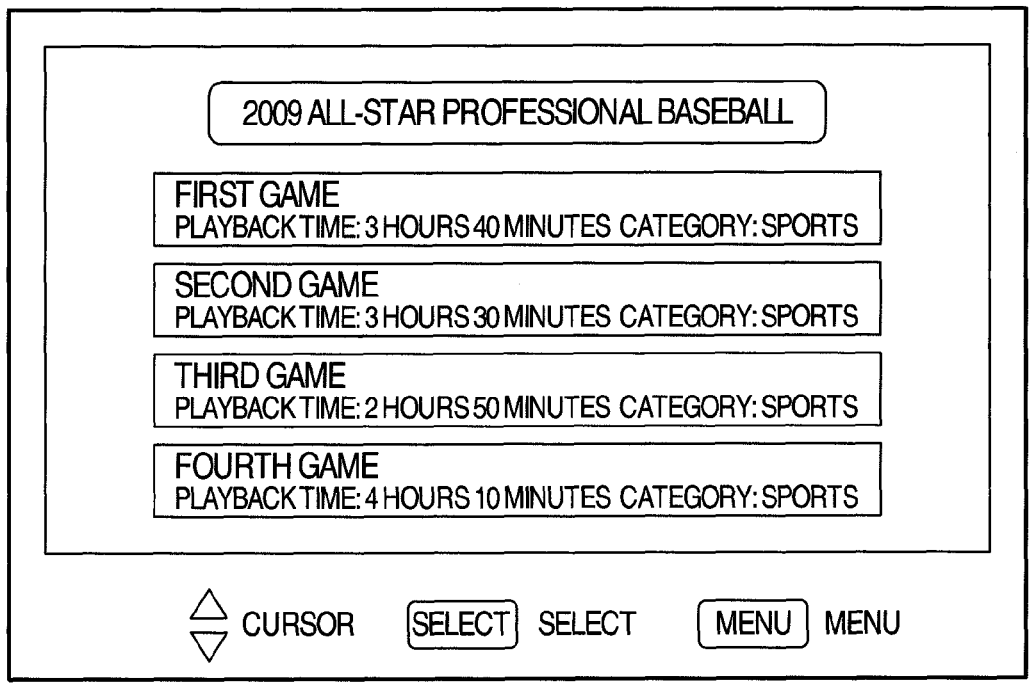
FIG. 7 is an example of a content list display screen of the receiver device.

By receiving the designation of content search browse, the content management unit in the receiver device reads in the content guide metadata 100 of respective contents stored in the hard disk 16 of the receiver device together with the downloaded contents, and a content list screen is displayed on a display device 18 used for a usage content selection designation as shown in FIG. 7 (step 1001).

Figure 8:
FIG. 8 is an example of a content detail display screen of the receiver device.

The user selects desired contents from the list indicated on the screen in FIG. 7, and the content management unit accepts the selection of contents via the remote control I/F 21 (step 1002). The content management unit in the receiver device 3 further reads in detailed information from the information of content guide metadata 100 in the contents, and detailed information, such as the thumbnail of selected contents, program outline, playback time, license associated information, usage start time limit, etc. is displayed as shown in FIG. 8 (step 1003).

The detailed information also contains the export allowable times read out from a column 145 of the content guide metadata 100 in FIG. 3. The user checks whether the export of the detailed information can be executed (remaining export times). If the export can be executed for the contents, an export button is operated by the remote control unit to designate the execution (step 1004).

Figure 9:
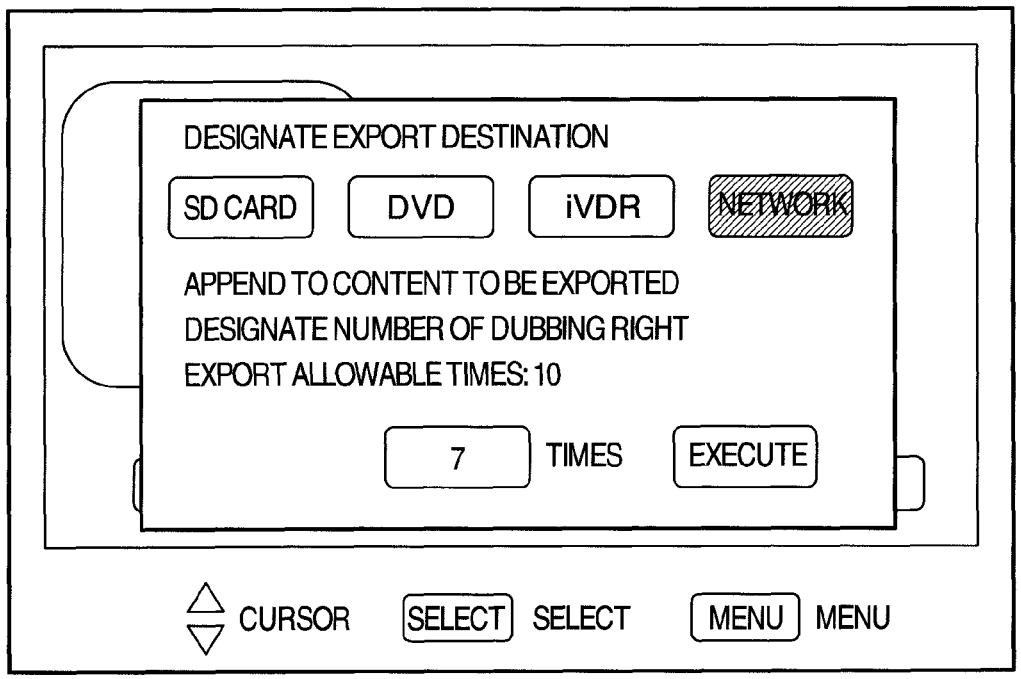
FIG. 9 is an example of an export destination designating screen of the receiver device.

The export processing unit in the receiver device 3 accepts the designation of the export execution to display an export destination selecting screen as shown in FIG. 9 (step 1005).

The user is subjected to the designation such that the copy allowable times to be appended to the exporting contents is designated, when selecting and exporting the export destination media class, to execute the export (step 1006).

The export processing unit only selects the medium having a medium format conversion function in the receiver device 3, among of the media capable of enforcing the right of export described in a column 144 of the content guide metafile to display them as a candidate destination, as medium class becoming the export destination candidate on the export destination selecting screen. The export processing unit masks an input of a column designating the copy times to be appended to the contents while the column is remained displaying a default 0, when the export destination medium has a rule prohibiting the export.

In addition, the copy times appended to the contents to be exported means number of times for when the contents are copied to the medium in the copy destination and can further be copied to other medium in there by several times.

In this regard, the copy times appended to the export contents is designated by the number of dubbing in this embodiment. That is, "ten dubbings" is defined as a right of "copy of nine times +move of once." The number of dubbing is a value represented by the copy times+1. Therefore, the copy times of the exported contents=the number of dubbing−1.

Since an upper limit of the export times appended to the contents or the copy times is determined as a value managed as the number of export license by the copyright management server when the contents are downloaded, it is obviously impossible to export the contents for a remaining N times of allowable export, as contents of N or more times of allowable copy. In the case of exporting the contents of remaining N times of allowable export as contents of M (<N) times of allowable copy, the remaining times of the export for the contents in the receiver device is set to N−M−1 times by subtracting M times appended to the export destination contents and once consumed for copying the content itself to the export destination.

In this embodiment, a reason why the number of dubbing is designated is that the export license is consumed by one greater than the designated number of user to therefore provoke suspiciousness when designating the right appended to the contents to be exported as the copy times by the user and "ten dubbings" "can only be moved after copying nine times" as a right concept after the export.

In the screen shown in FIG. 9, when the user designates seven dubbings for the remaining ten times of copy, that is, designates to execute the export to another external device via the network as contents for six times of copy in the export destination, the export processing unit in the receiver device 3 displays a check screen designating that the remaining export times becomes three times (10-6-1) of export (step 1007), in this way, the user is subjected to a recheck for the export execution (step 1007).

Figure 11:
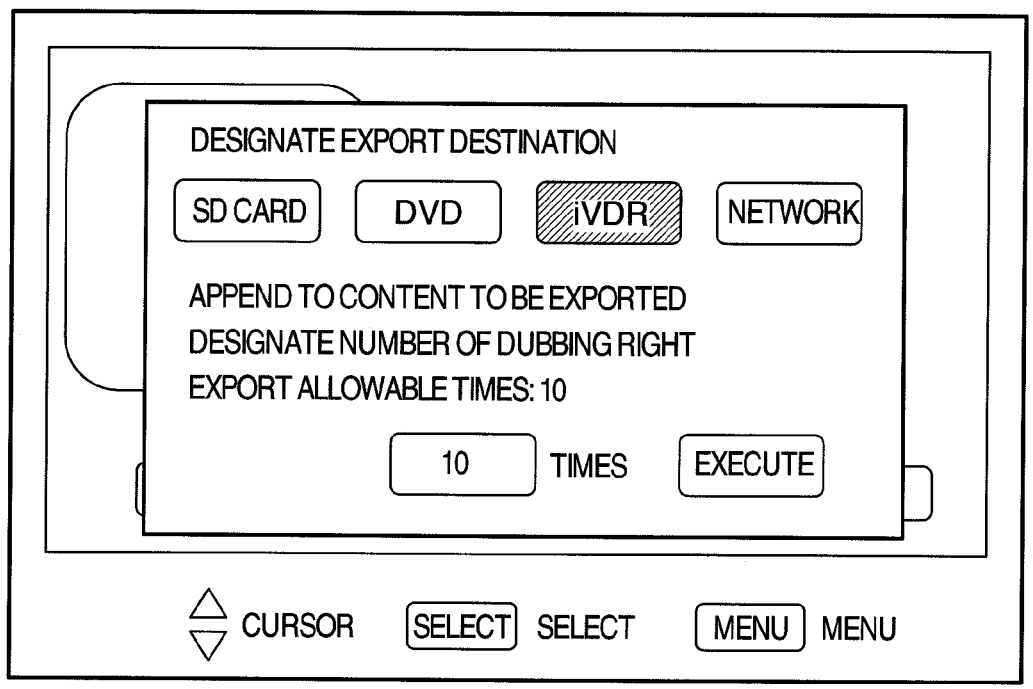
FIG. 11 is an example of the export destination designating screen of the receiver device.

As shown in FIG. 11, when the copy times appended to the contents is set to ten, that is, the export execution is designated to a recording medium, such as iVDR, by appending the right for all of the exports to the contents, the export processing unit in the receiver device 3 makes the contents in the receiver device 3 set to a disallowable export thereafter. In this case, an export recheck screen becomes shown in FIG. 12.

When the user designates the export execution on the recheck screen, the export processing unit in the receiver device 3 starts the copy or move of the contents.

First, the export processing unit reads out and analyzes a playback control metafile of the corresponding contents in HDD 16 so that the export license is acquired from the copyright management server, in advance of the export.

The export processing unit checks that the license ID described in a column 146 of the content guide metafile is written in a column 224 of the playback control metafile (step 1008). Further, the export processing unit also checks whether the export license, which is acquired from the copyright management server into the receiver device and does not execute the export, is held or not by a description in an export license hold buffer (step 1009).

FIG. 13 shows a configuration file of the export license hold buffer in the receiver device, stored in HDD 16. One export license is distributed to the access of one acquiring request from the receiver device 3 as a client, from the copyright management server. The copyright management server extinguishes the right of one (export of once) export license at a time of ending a distribution processing of the export license. The export processing unit in the receiver device executes a processing of decreasing one from the remaining export times of the corresponding contents at a time of completing once the export processing, as the receiver device, for one license distributed from the copyright management server.

Therefore, the receiving device acquires the export license from the copyright management server, thereafter, an executable export right is held in the receiving device when an actual export processing is not executed by causing some reason. The export license hold buffer records the export license being held in the receiver device, or is a list for number of pieces of holding data for the license ID and an export license 320.

The export processing unit accesses to the copyright management server to acquire the export license when the export license is not held, but holds short number of requests. A signature verification of server URI is executed on the basis of a certificate and signature information of the playback control metafile so as not to induce an abusive copyright management server. The distribution of license is received from the copyright management server (step 1010) if the signature verification is succeeded only.

Specifically, the authentication processing unit in the receiver device 3 completes a mutual authentication with the license copyright management server 2 to share a key for encrypting the license request/delivery message and transmit a message containing the license ID for specifying an acquisition target license. The copyright management server determines whether the receiver device 3 has the right of acquiring the corresponding license, and transmits the license if determining that the right is held therein. The authentication processing unit in the receiver device 3 cuts off an authentication cipher communication path secured with the server if the transmission and reception of license is ended without trouble.

The export processing unit in the receiver device 3 acquires the license to hold the acquired export license in the export license hold buffer (step 1011). If the export license hold buffer already acquires the export license of license ID, the number of held pieces in the description column is increment by one. If the export license is not held yet, the description of license is added to the buffer to make the number of held pieces one. The export processing unit repeats the above-mentioned license acquisition processing until the required number of license for the export to be executed is acquired.

As shown as an example in FIG. 9, in the case of the export to be transmitted to another device via the network as the contents of six allowable copy, the license acquisition processing repeats seven times since seven export licenses are required.

The export processing unit executes the export processing when acquiring necessary number of license. The export processing unit first checks whether a column 212 in the playback control metafile designates an encrypted or non-encrypted contents (step 1012). The processing proceeds to the writing into the medium and an output processing to the network, without change, if it designates the non-encrypted contents.

The export processing unit decodes the content data by using the content cryptographic key described in a column 322 in the export license (step 1013) if the column designates the encrypted contents. The format of necessary contents and a rate are transformed, and the cipher and copyright management data are appended to the content data to execute an external output or a write into the medium, in response to the export destination (step 1014).

Figure 15:
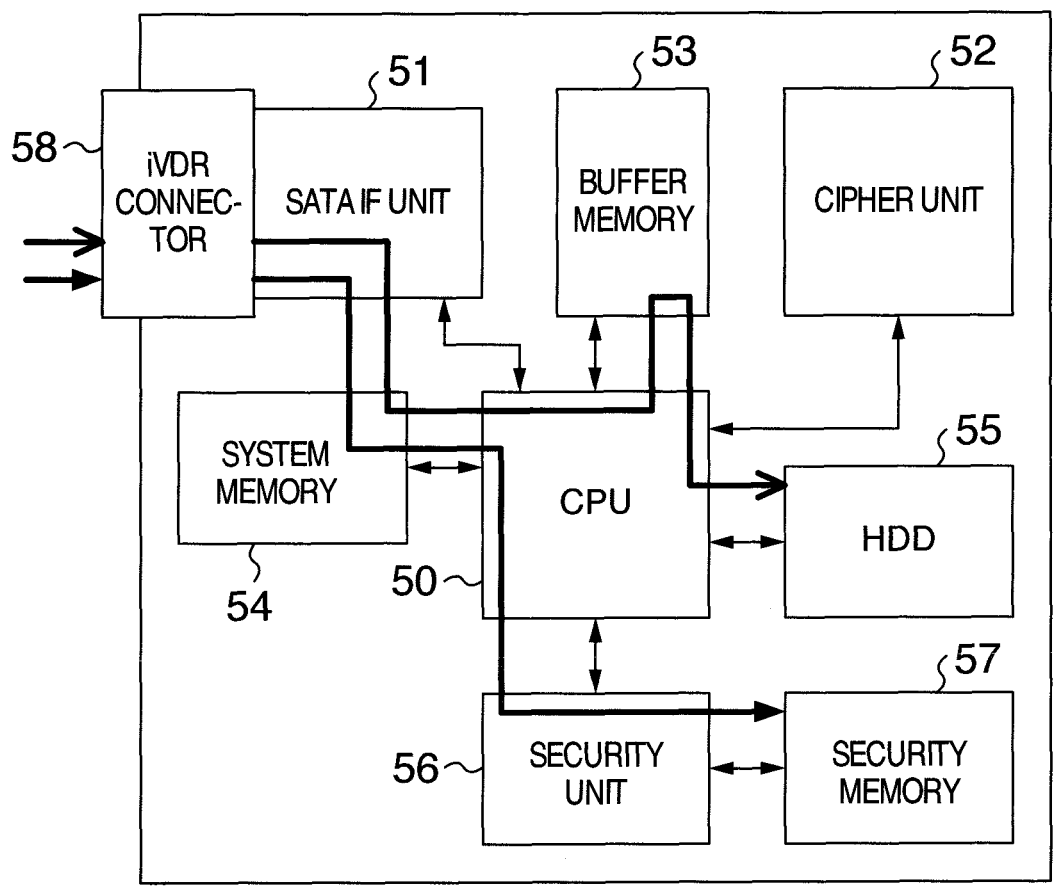
FIG. 15 is an example of a hardware configuration of an export destination removable medium.
Figure 16:
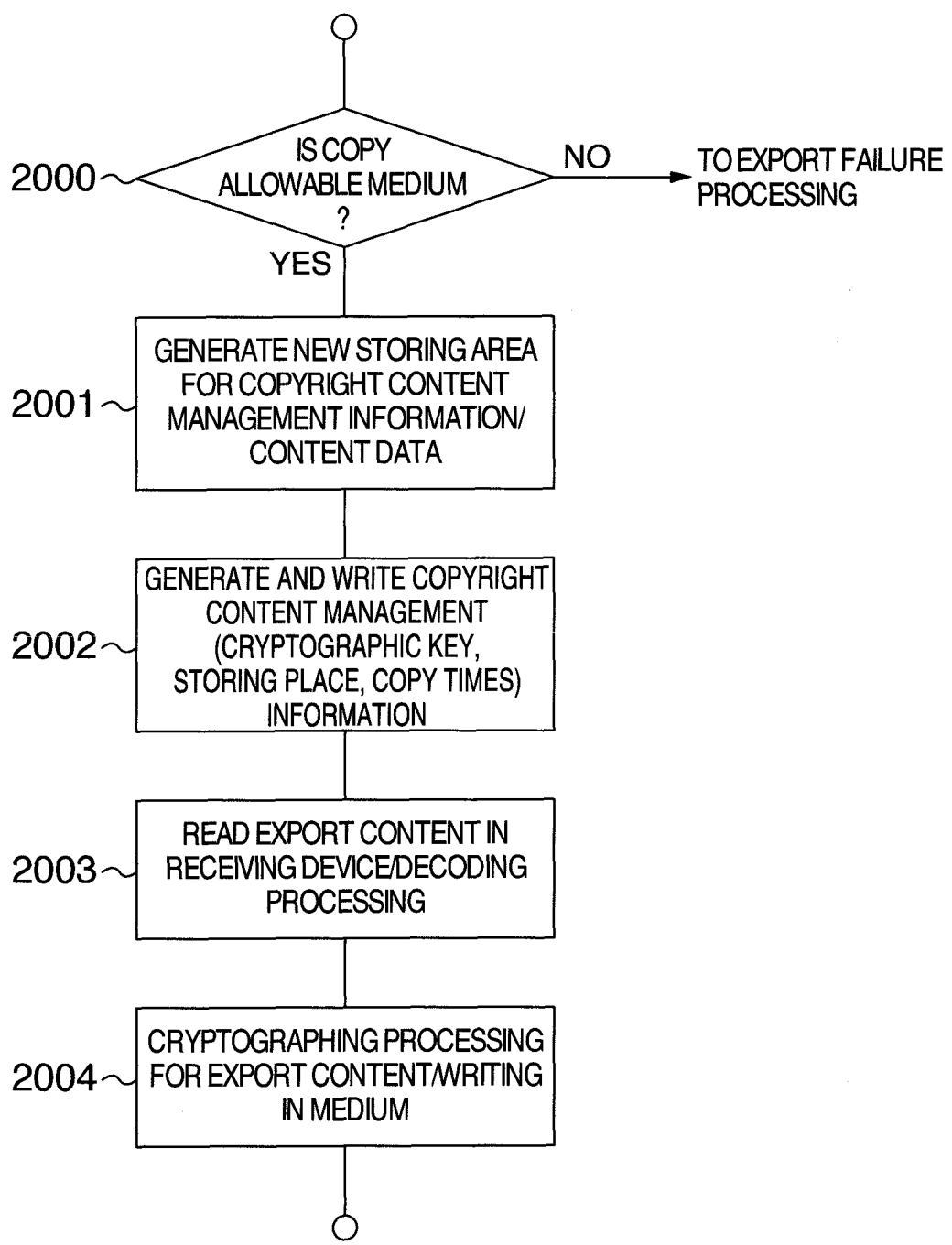
FIG. 16 is an example of an export processing to the removable medium.

When an export output processing in the receiver device 3 is a write processing into the removable medium to which the interface drive 29 for access is pertained in the receiver device, such as iVDR 31 and SD 31, an iVDR disk configured as shown in FIG. 15 is mounted, for example, on the receiver device to execute the write along with a procedure in FIG. 16. The iVDR in FIG. 15 is coupled with the receiver device 3 through a Serial Advanced Technology Attachment (SATA) interface (iVDR connector 58, SATA interface 51). The recording control unit 32 in the receiver device 3 reads and writes the removable medium by using the interface drive 29.

In addition, the removable medium is not limited to iVDR, and a medium may be capable of recording a format for managing the copyright of, such as a magnetic disk, magnetic optical disk, BD disk, SD card, flash memory, SSD (Solid State Drive), etc. In this case, the interface shown in FIG. 15 should be corresponded to the medium.

The recording control unit 32 executes the authentication of the iVDR disk set in the drive to check that the iVDR has a tamper resistant area (security unit 56, security memory 57) (step 2000). The recording control unit 32 checks whether a free space capable of copying the contents is present in the storage medium (security memory 57) of the tamper resistant area and normal storage medium (HDD 55).

In the copyright management system of iVDR, there are the tamper resistant area (security unit 56, security memory 57) having security required a special command processing for a read and write which cannot be accessed directly from the user and the normal data area (HDD 55) which can be accessed normally from the user as a normal memory.

The copyright contents management information required for when using the contents managed as copyright in iVDR, such as copy count information, age count information and a cryptographic key for decoding the encrypted data, is stored in the security memory 57 as tamper resistant area, which is configured to be protected from a falsification. The actual video data of the encrypted copyright contents and non-encrypted contents as free contents are stored in HDD 55 as the normal data area, which can be read and written by a general method used for HDD.

FIG. 16 shows an example of the export processing to the removable medium, which is a detail of the step 1014 in the flowchart shown in FIG. 6.

The recording control unit 32 secures an area for storing the actual video content data in HDD 55 as a management information storing area of the copyright protection contents in the security memory 57 (step 2001) if there is a necessary free area for writing the export contents into both the tamper resistant area (security memory 57) and normal storage medium (HDD 55).

The recording control unit 32 generates copyright content management information for the iVDR copyright management system of the export contents, that is, the copyright management information, such as an initial address of the area in HDD 55 secured as an area for storing the actual video content data, the cryptographic key of the copyright protection system for iVDR 31 using when storing the encrypted contents, the copy count and age count of the contents, etc. to write in and store in the secured storing area for the copyright protection content management information (step 2002).

At this time, the copy allowable times appended to the export contents is transcoded to a format in accordance with the format of the copy count information to be used in a copy times management function of iVDR by the export processing unit, therefore, one piece of copyright management information of the contents is generated to be stored in iVDR.

In an example shown in FIG. 11, the export processing unit acquires the copy allowable times information designating the contents having the right of copy of nine times+move of once, and the copy allowable times information is transcoded to a format in accordance with the format of the copy count information to be used in the copy allowable times function of iVDR. Thereafter, the recording management unit 32 writes and stores the copy count information in the storing area of the copyright protection content management information of iVDR.

Thereafter, the export processing unit decodes the encrypted data of video contents read out from HDD 16 by using the cryptographic key of the export license stored in the export license hold buffer 400 (step 2003). The recording control unit 32 applies a cipher by using the cryptographic key dependent on the copyright protection system of iVDR 31 storing the decoded contents as one piece of management data of the contents in the tamper resistant area to write in an address area as a storing place of the content data (step 2004).

As mentioned above, the export contents, as content data along with the copyright management system of iVDR, is copied to iVDR 31 as export destination.

An export output processing in the receiver device does not write in the above-mentioned other medium and device, but a preprocessing is required for transmitting and receiving the copyright protection content data dependent on a distant device to be communicated and the type of communication path, in the case of a transmission processing from a communication port.

For example, in the case of export output for sending the export content data as IP packets from IP port since the video contents are transferred to the IP network-compatible storage device 5 via the IP network managed by the router 44 in this embodiment, the authentication processing unit in the receiver device 3 executes the authentication processing, as preprocessing, for mutually certifying that a common configuration for safely transmitting and receiving the copyright management data via the IP network is supported by both the receiver device 3 and IP network-compatible storage device 5.

Figure 10:
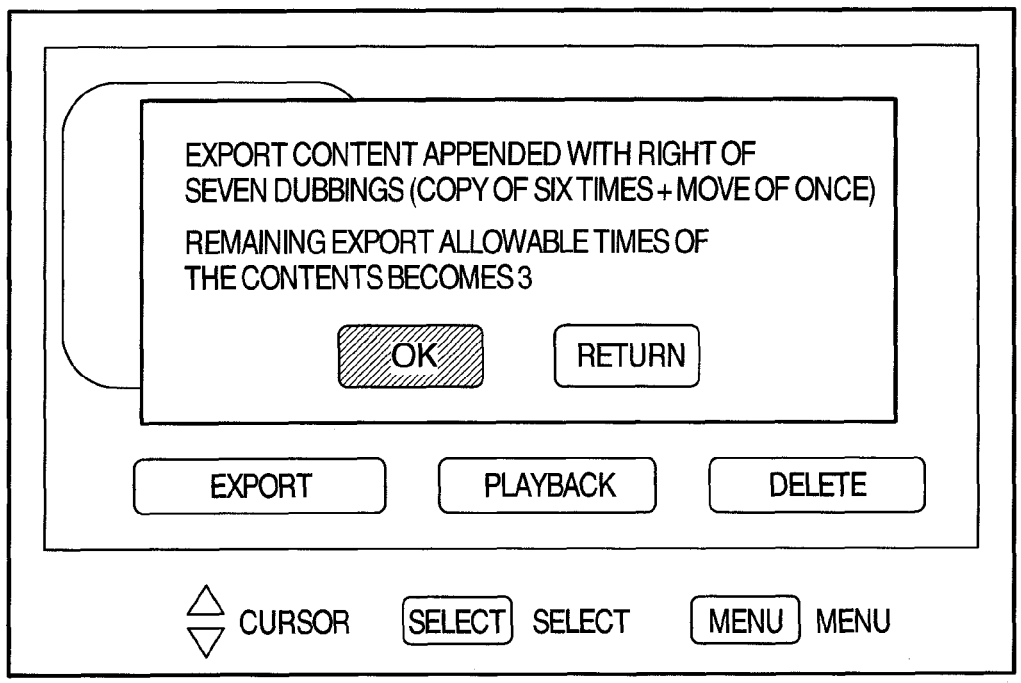
FIG. 10 is an example of an export condition check screen.

At the time of authenticating the preprocessing, the stream data control unit 15 exchanges, between both, the cryptographic key dependent on the network copyright protection system for dencrypting the export content data to be flown on the IP network from now. The export processing unit in the receiver device 3 acquires the copy allowable times information, that is, the copyright management information of the contents containing information designating that the contents have the right of move after the copy of six times in the example shown in FIG. 10, when succeeding the authentication. The export processing unit also acquires the video content data decoded by using the cryptographic key of the export license read out from HDD 16. The export processing unit transforms to encrypted IP packet data by using the cryptograph key which determined the contents data and copyright management information in the authentication to send to the network from the IP communication IF 22. The export output processing is executed by the above-mentioned processing.

The export destination external device received the transmitted IP packet data decodes the received communication packet data by using the cryptographic key determined in the authentication of the preprocessing, thereafter, transforms to a format in accordance with the copyright protection system of own device to apply the cipher thereto and write in the storage medium in the own device.

In addition, the copyright management method of the device and medium for storing the video contents is various for every medium, and the copyright management method is sometimes modified for the same medium, therefore, the execution procedure of the export is not limited to the above-mentioned method.

The export processing unit deletes the license information held in the export license hold buffer if the export is succeeded, and subtracts the copy allowable times+1 (copy of once for the export) appended to the exported contents from a value recorded in a column 145 designating the export allowable times in the content guide metafile and update the value (steps 1015, 1016). For example, in the case of export shown in FIGS. 9 and 10, since the copy allowable times appended to the contents is six, the column 145 designating the export allowable times is updated to three because of subtraction 10−6−1, but the value in the column was 10 before the export.

Figure 12:
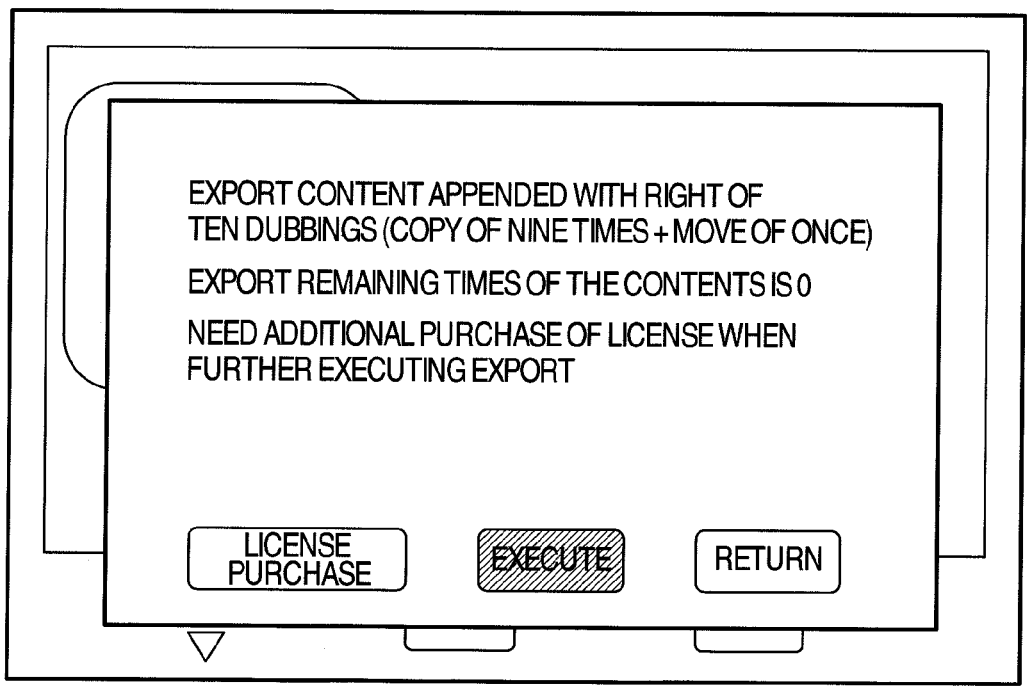
FIG. 12 is an example of the export condition check screen of the receiver device.

In addition, in FIG. 12 showing an example of the playback check screen, when the disappearance for the number of license possessed by the user in present is avoided and the export is executed by appending with the copy times greater than the number of present possession, the export processing may be stopped once to access to the content delivery server 1 and proceed to a processing for executing an additional purchase for the content license (step 1017).

In the above-mentioned example, the purchased contents are stored in HOD 16 once and the export is then executed, however, the export may be executed at the same time when the contents are downloaded from the content delivery server 1.

In the case of executing the export at the same time of the download, an operation of the list display of the usable contents at the step 1001 is executed by accessing to the content delivery server 1 to acquire a HTML document on a downloadable content list, be displayed by a browser, and provide the selection screen in FIG. 7 for the user.

Figure 14:
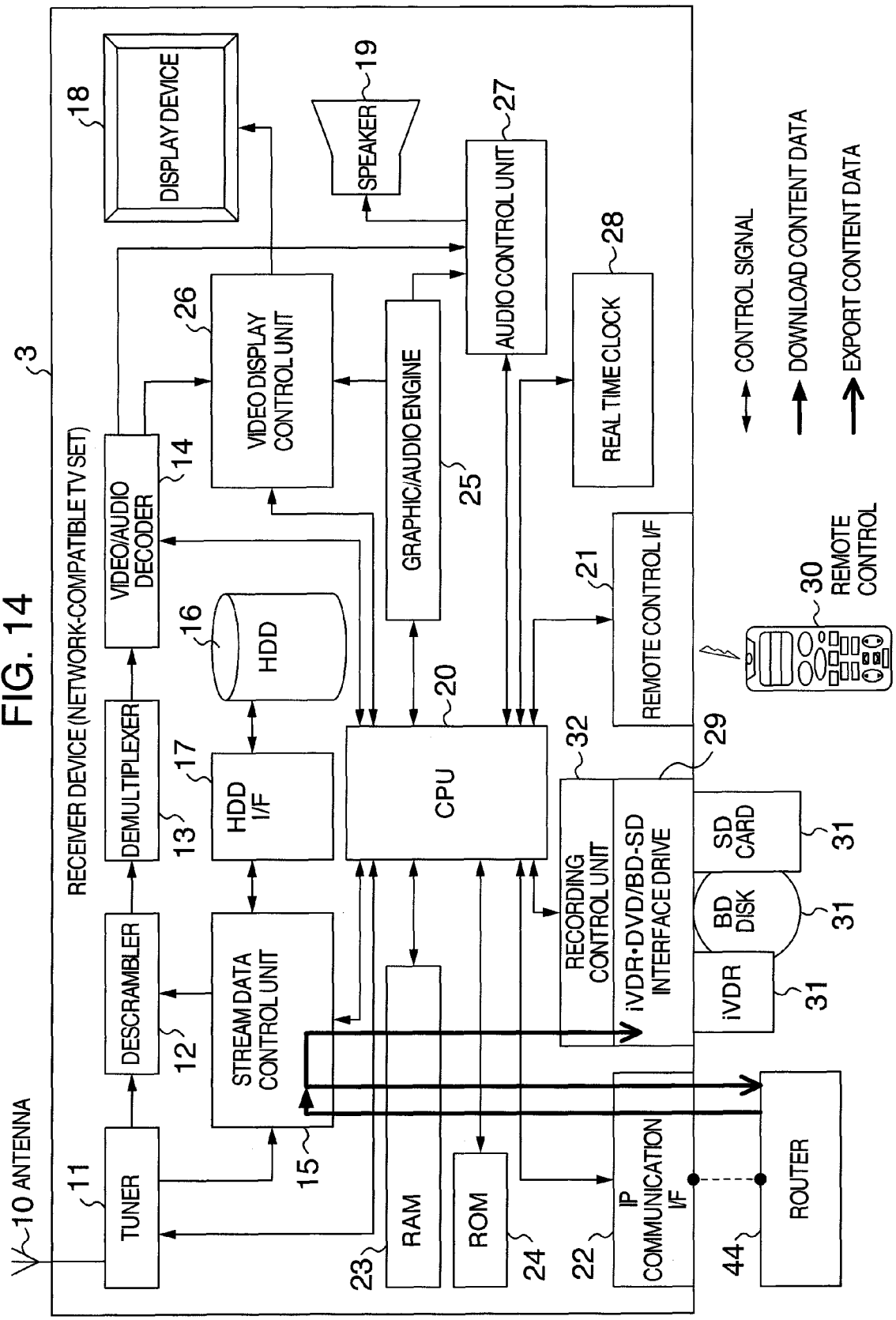
FIG. 14 is an example of a content data flow in the receiver device.

At the step 1003, the content guide metafile 100 and playback control metafile 200 of the contents are acquired from the content delivery server 1 at a time of designating a downloaded export content to display the screen in FIG. 8. The data flow of executing the export shows in FIG. 14 in the export at the same time of the download, and the receiver device 3 is similar to a contents license transformation device.

As mentioned above, the export license can be moved as the copy allowable times of the export contents while holding the right of the owner of copyright in accordance with the copy allowable times restriction.

In addition, in this embodiment, it is configured that the export processing unit executes the export processing and the recording control unit 32 executes the write in the removable medium etc., however, the export processing unit may execute the processing of recording control unit 32. The recording control unit 32 may also execute the processing of export processing unit.

Embodiment 2

When the copyright protection of the export destination medium has a function of managing the usage time period of the contents, the content usage time period in the medium is written in the export license, and the usage time period is set as the copyright protection information of the export destination. In consequence, the management of usage time period can be executed in accordance with the copyright protection function of medium even when the medium is taken out to watch/listen the contents by another device.

That is, even when the exported medium is set in another device to play back the contents, the contents beyond the usage time period can be made disapprove of the watching/listening.

In such case of executing the export appended with the usage time period, the usage time period described in the metadata appended to the contents is referred, as an export condition, by using the user interface of receiver device, and it is desirable that the export is executed by designating usage time period information.

In the usage time period information of the contents downloaded to the medium, the metadata is standardized and ruled as a watching/listening time period in a body, but the usage time period information of the export destination medium is not ruled. Therefore, it is required to separately make rule of the medium for every type and deliver the contents.

In contrast, the watching/listening time period of body is often matched with the usage time period in the export destination medium in general operation. In this case, the metadata to be delivered is overlapped with every type of the medium. In consequence, a waste occurs, a transmitting efficiency becomes worse, and an increase of the storing area for the metadata is also provoked.

In this embodiment, the usage time period information of the export destination in the license management metadata acquired by appending to the contents is referred when exporting the contents, and a means for executing the export is provided after noticing the usage time period to the user, so that the contents can be used by checking the usage condition of the export destination medium for the user.

In the case of operating by matching the usage time period information of the export destination with the watching/listening time limit of a download terminal body, the information designating a matching is provided in the license management metadata or the license to refer the information by the terminal. If the information is matched therewith, the usage time period information written in the playback license used for the watching/listening in the body is referred to notice the usage time period to the user in the export.

The configuration of this embodiment is the same as that of the first embodiment in FIG. 1 and FIG. 2.

Figure 17:
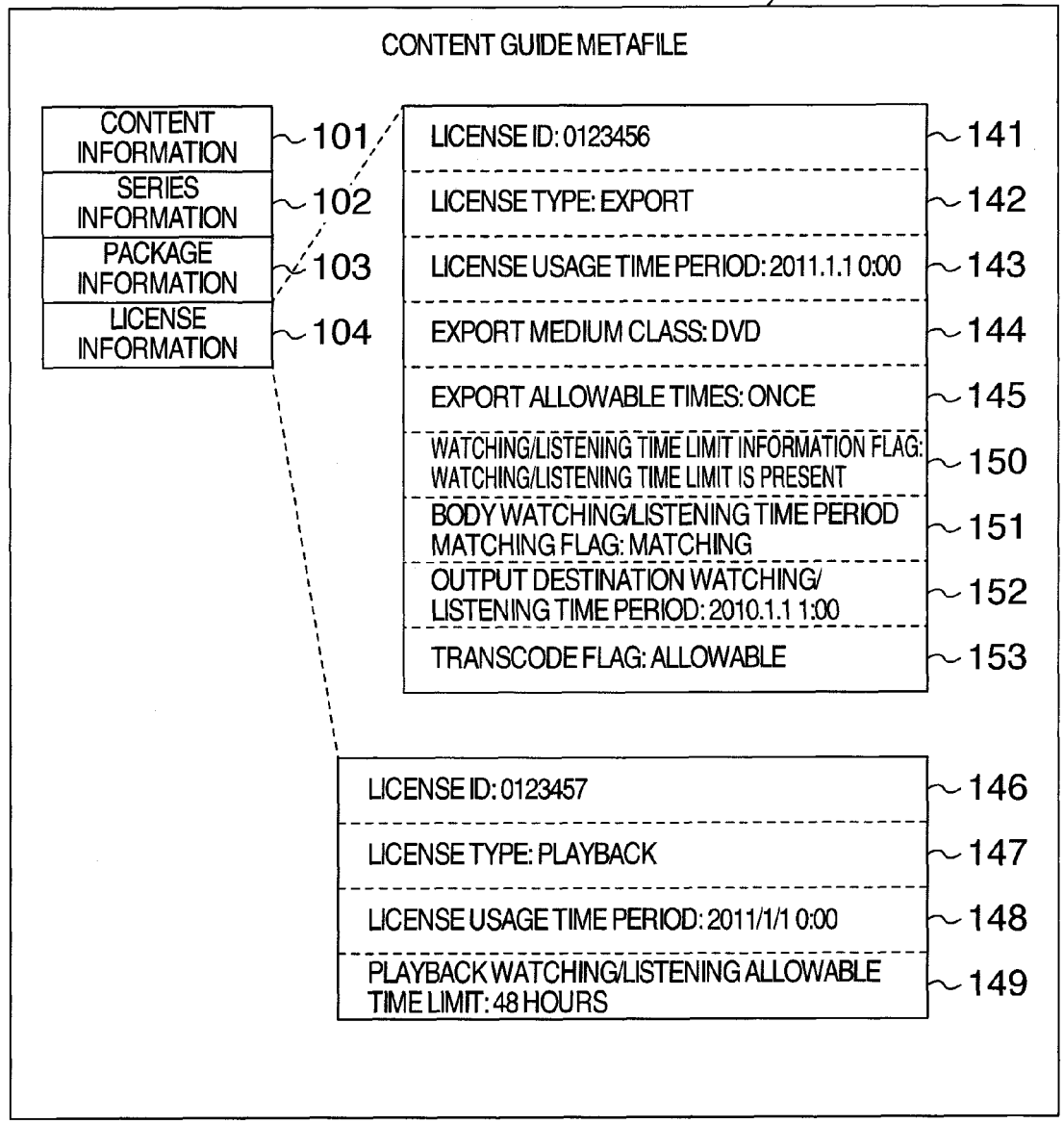
FIG. 17 is a configuration example of a content guide metafile.

FIG. 17 is a configuration example of the content guide metafile.

In the license metadata 104, when both the export license and playback license are appended to certain contents, as an example, the license information of the export license designating reference numerals 141 to 145 and 150 to 153 and of the playback license designating reference numerals 146 to 149 in FIG. 17 are delivered. A description is omitted for the elements in FIG. 17 designating the same as those in FIG. 3.

The license acquired from the copyright management server 2 is uniquely identified by the license ID in the columns 141, 146, and whether the export license or playback license is identified by the license type in the columns 142, 147.

License usage time limit 143, 148 designates a time limit during which the license can be acquired from the copyright management server 2.

The export license has information, such as an export medium identification 144, an export allowable times 145, a watching/listening time limit information flag 150, a body watching/listening time period matching flag 151, an output destination watching/listening time period 152, a transcode flag 153, etc. The playback license has information, such as a playback watching/listening allowable time limit 149 etc.

The export medium identification 144 designates an export allowable medium, and the export allowable times 145 designates the number of times capable of exporting to the designated medium.

The watching/listening time limit information flag 150 is information designating whether the export is executed by appending with the watching/listening time period. That time period information is designated to the output destination watching/listening time period 152 if the export is appended with the watching/listening time period.

The body watching/listening time period matching flag 151 indicates whether the operation is made match with the watching/listening time period in the export destination medium and the output destination watching/listening time period 152 of the playback license.

If the flag designates a value of "matching", it is unnecessary to write the watching/listening time period information in the output destination watching/listening time period 152. The time period information can also be used as the watching/listening time period in the export if the playback watching/listening allowable time limit 149 of the playback license is described.

In the case of executing the operation which makes match with the usage time period of watching/listening the body and the usage time period of the export destination medium, the metadata used for watching/listening the body is shared and used as metadata in the export to be able to cut a metadata volume. In FIG. 17 showing an example, a value "2010.1.1 1:00" is entered in the output destination watching/listening time period, however, it is unnecessary to write the watching/listening time period information in the output destination watching/listening time period 152 if the body watching/listening time period matching flag 151 designates a value of "matching", therefore, the value may also be blank.

In addition, the description format of output destination watching/listening time period 152 and playback watching/listening allowable time limit 149 is acceptable of a description method such that the format: is designated by an absolute date and time, such as A year, B month, C date, D time, E minute and F second to G year, H month, I date, J time, K minute and L second; is relatively designated that the time immediately after export is set to a base point, such as M time, N minute 0 second after export; and is designated by the combination of the above-mentioned manners, such as, by the time of G year, H month, I date, J time, K minute and L second, after export.

The configuration of the second embodiment in FIG. 4 is the same as that of the first embodiment.

Figure 18:
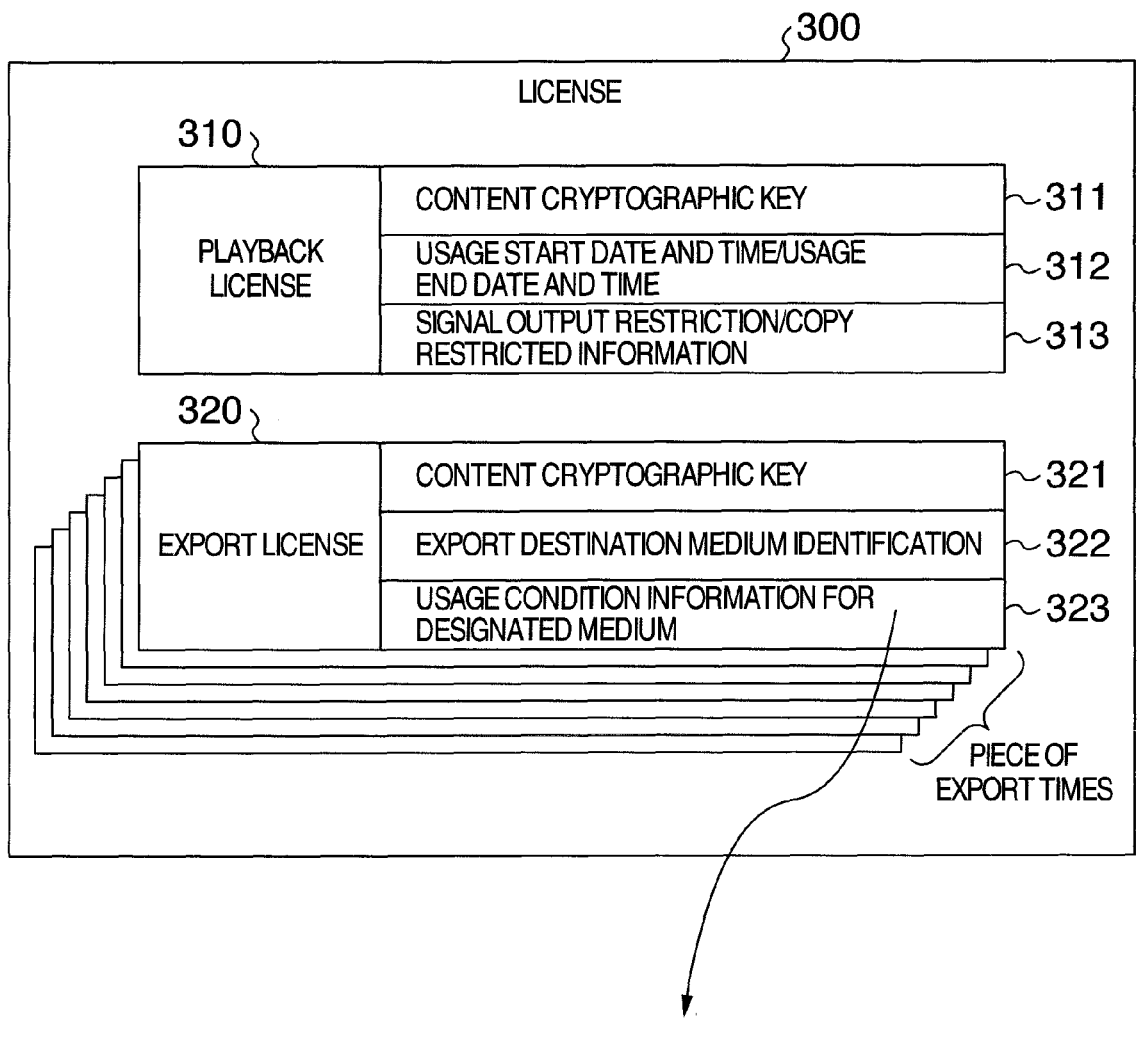
FIG. 18 is a data configuration example of the playback license and export license.

FIG. 18 is a data configuration example of a playback license 310 and the export license 320 to be distributed to the receiver device from the copyright management server in the contents of FIG. 17, in the system. The playback license 310 contains a content cryptographic key 311, a time period information (usage start date and time, usage end date and time) 312 to be able to watch/listen to the contents and a signal output restriction/copy restricted information 313 describing a copy prohibition and permission condition etc. for digital and analog output of the video and audio.

The export license 320 contains a content cryptographic key 321, an export destination medium identification 322 containing information of an export allowable medium (DVD, memory card, etc.) or an output IF (output to IP network by using DTCP-IP protocol) and usage condition information 323 for designated medium.

The usage condition information 323 for designated medium has information designated by reference numerals 331 to 334. A copyright protection flag 331 is information designating whether the contents to be exported are protected by the copyright. A body watching/listening time period matching flag 332 is information designating that the watching/listening time period in the export destination medium is made match with the watching/listening time period of the body playback when protecting the export contents by the copyright. Output destination watching/listening time period information 333 designates the watching/listening time period for every medium when the watching/listening time period of the export destination medium is not matched with the watching/listening time period of the body playback. A transcode flag 334 is information representing whether the transcode, such as a codec transcoding, is executed in the export.

The body watching/listening time period matching flag 332 is information used for the same purpose of the body watching/listening time period matching flag 151 in the license information 104. When the watching/listening time period in the export destination medium is designated to the user before the export, the export processing unit refers to the body watching/listening time period matching flag 151 to determine whether the playback watching/listening allowable time limit 149 or output destination watching/listening time period 152 is designated. In this case, the determination may be executed by using the value of body watching/listening time period matching flag 332 in place of the body watching/listening time period matching flag 151.

In the case of referring to the body watching/listening time period matching flag 151, since the contents guide metafile 100 may only be referred and designated to the user, the processing in the receiver device 3 becomes simple. In contrast, in the case of referring to the body watching/listening time period matching flag 332, it is required to refer it together with the license 300. However, the content guide metafile 100 should have a general versatility, that is, XML schema is officially open and specification revision is also implemented strictly, therefore, it takes long time and toil to add special primitive attribute information. In contrast, it is unnecessary to add information, such as intrinsic body watching/listening time period matching flag 147 in this embodiment, therefore, there is an advantage for execution without changing the existing metafile format.

In the export license, since one license is consumed for the export of once, N pieces of export license are appended to the contents of N times of allowable export.

Figure 19:
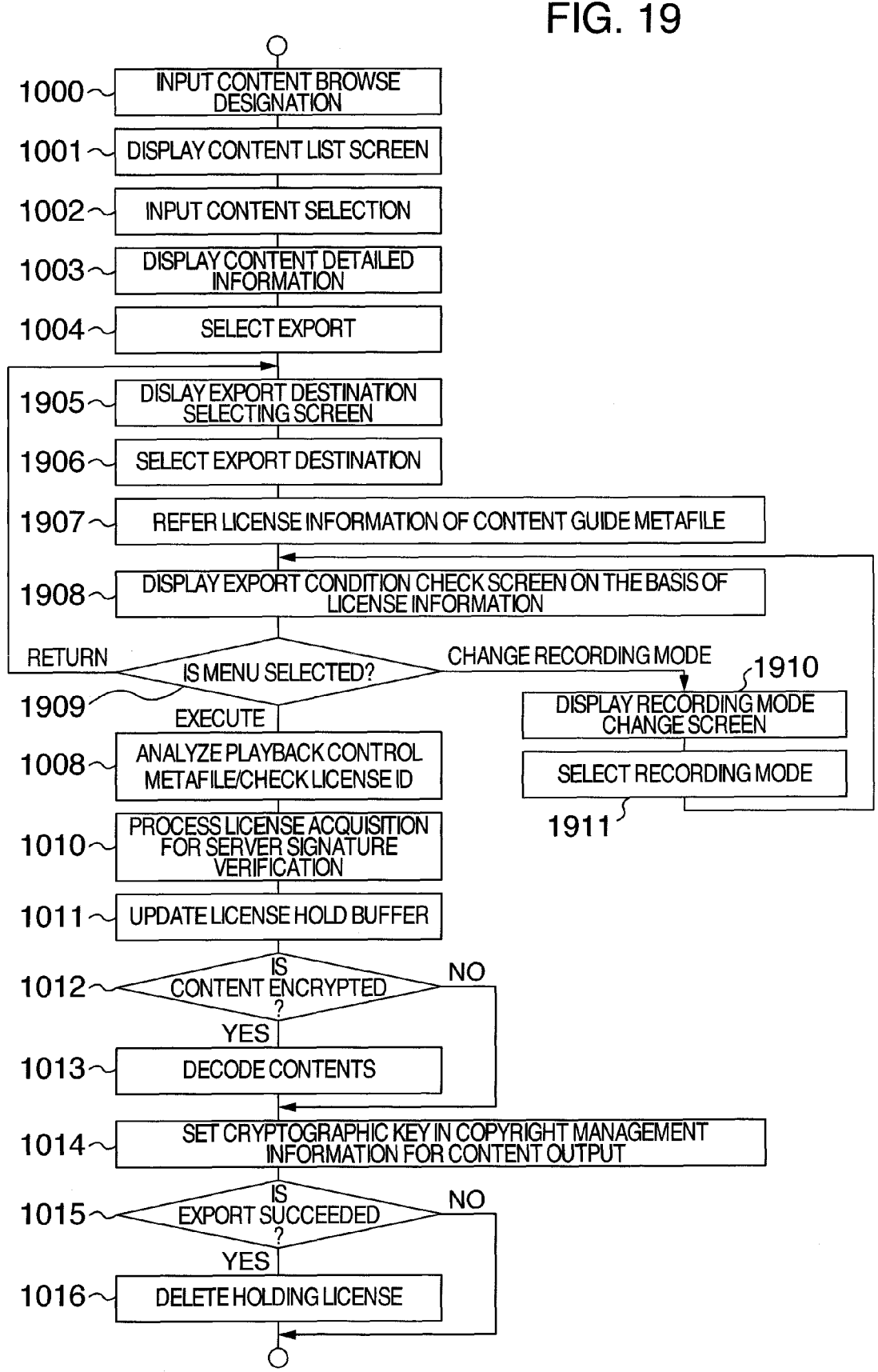
FIG. 19 is a processing flow example of the content export function appended with the copy times.

FIG. 19 is a flowchart example showing a processing of the content management unit and export processing unit for executing the export appended with the watching/listening time period in the receiver unit 3 in the system.

When the user uses the downloaded contents, first, the browse of usable contents, downloaded to the receiver device 3 at present, is designated by operating the remote control button. The remote control I/F 21 in the receiver device 3 receives a browse designation from the user (step 1000).

By receiving the designation to the content search browse, the content management unit in the receiver device reads in the downloaded contents together with the content guide metadata 100 of the respective contents stored in hard disk 16 in the receiver device and display a content list screen for designating the selection of usable contents as shown in FIG. 7 on the display device 18 (step 1001).

Figure 20:
FIG. 20 is an example of the content detail display screen of the receiver device.

The user selects the contents to be used from the list designated by the screen in FIG. 7, and the content management unit accepts the content selection via the remote control I/F 21 (step 1002). The content management unit in the receiver device 3 further reads out detailed information from the information of the content guide metadata 100 for the contents to display the detailed information of the contents, such as a thumbnail of selected contents and program outline in the selected contents as shown in FIG. 20, playback time, video, audio, caption information, category information, etc., and license associated information, such as body watching/listening time limit and export times, watching/listening time limit of export destination, export time limit, allowable or disallowable transcode in the export, etc. (step 1003).

In the case of contents of allowing the export, the user can designate an execution by operating an export button on the remote control (step 1004).

The export processing unit in the receiver device 3 accepts the designation of export execution to display the export destination selecting screen as shown in FIG. 9 (step 1905), and the export destination medium class is made the user select (step 1906).

The export processing unit sorts only the medium having an output function to the other medium in the receiver device 3, from among the media, described in the column 144 of the content guide metafile, executable for the right of export, as a medium class becoming an export destination candidate on the export destination selecting screen, and they are displayed as a candidate destination.

Figure 21:
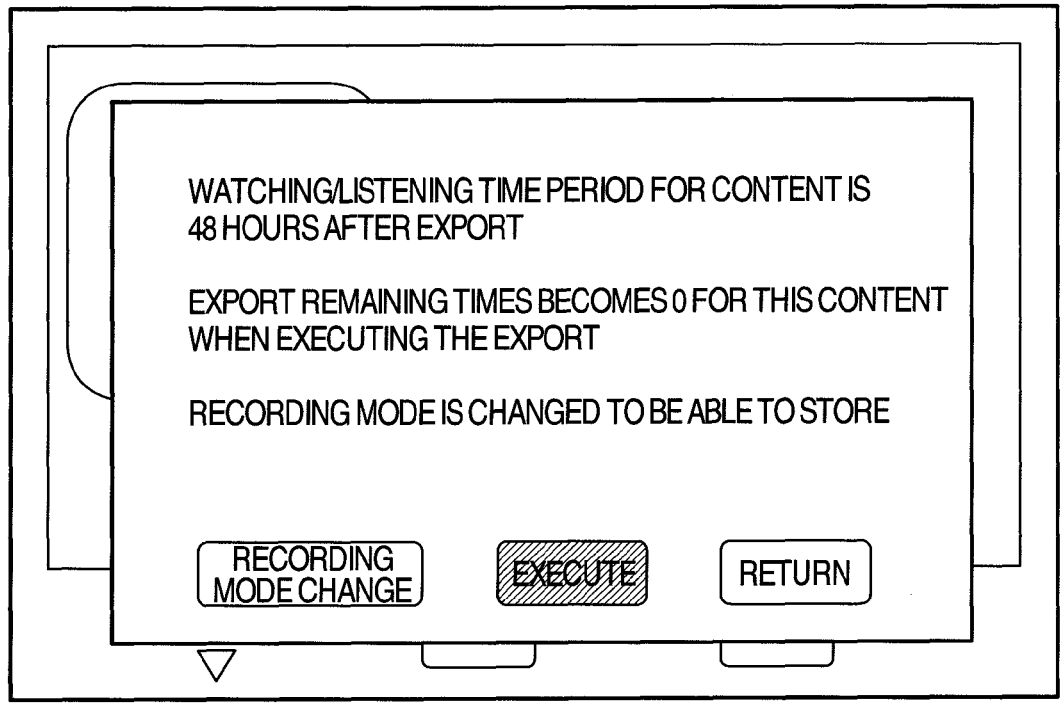
FIG. 21 is an example of the export condition check screen of the receiver device.
Figure 22:
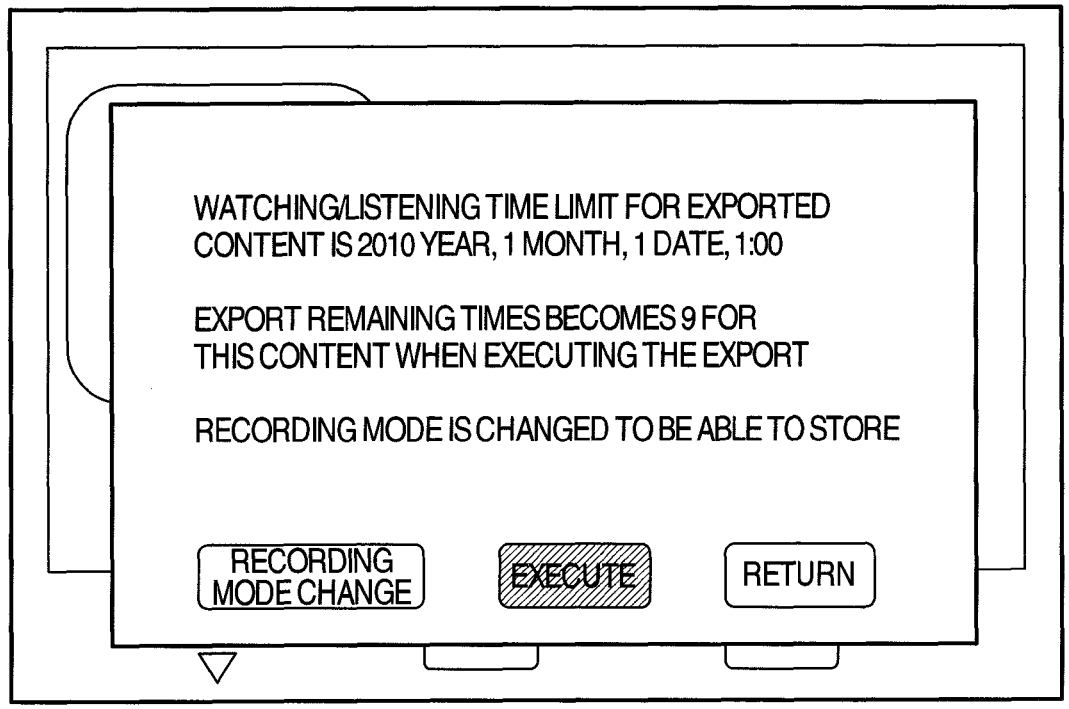
FIG. 22 is an example of the export condition check screen of the receiver device.

The export processing unit accepts the selection of export destination medium class to refer the license information 104 in the content guide metafile 100, refer the license information of export corresponding to the designated medium type (step 1907) and display an export condition display screen as shown in FIG. 21 and FIG. 22 on the basis of the information (step 1908).

Figure 24:
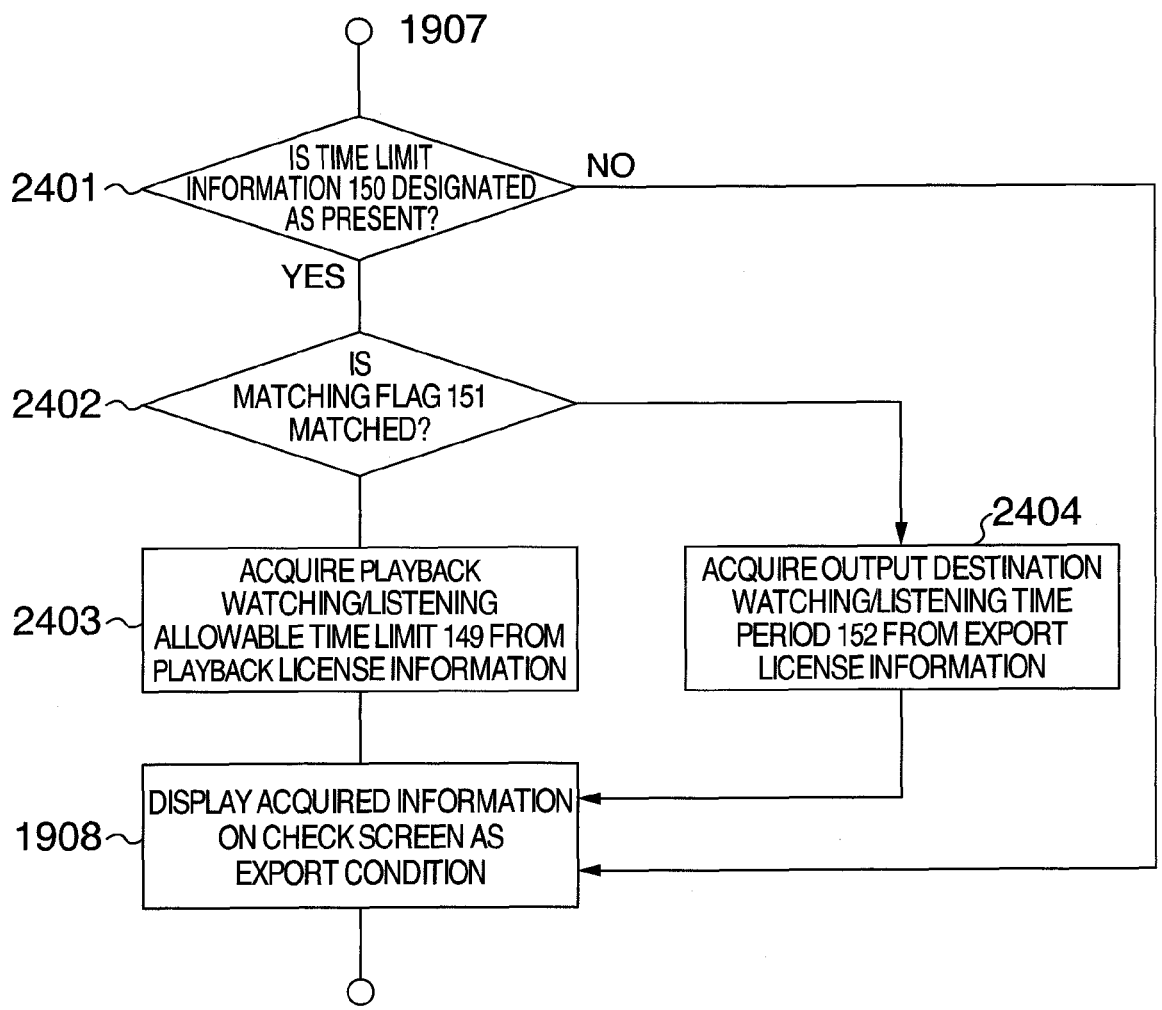
FIG. 24 is an example of a flow of displaying the export condition check screen.

FIG. 24 shows a flowchart example for displaying an export condition check screen. The processing at the steps 1907, 1908 will be described with reference to FIG. 24. The export processing unit refers to the license information 104 in the content guide metafile 100 to acquire the body watching/listening time period matching flag 151. The export processing unit determines whether the watching/listening time limit information flag 150 designates that "watching/listening time limit is present" (step 2401). If the determination does not designate that "watching/listening time limit is present" (if the watching/listening time limit is not present), the export processing unit makes display, as the watching/listening time limit is not present, on the export condition check screen (step 1908). If the watching/listening time limit information flag 150 designates that "watching/listening time limit is not present", it becomes unrestraint.

If the watching/listening time limit information flag 150 designates that "watching/listening time limit is present", the export processing unit acquires the body watching/listening time period matching flag 151. The export processing unit then determines whether the body watching/listening time period matching flag 151 designates "matching" (step 2402). If the flag designates "not matching", the export processing unit acquires the information of watching/listening time period designated in the output destination watching/listening time period 152 described in the export license information (step 2404) to make it display on the screen (step 1908). The export processing unit acquires the information of playback watching/listening allowable time limit 149 written in the license information 104 used for the playback license if the body watching/listening time period matching flag 151 designates "matching" (step 2403) to make it display on the screen (step 1908).

FIG. 21 shows a display example of when the watching/listening time limit information flag 150 designates that "watching/listening time limit is present" and the body watching/listening time period matching flag 151 designates "matching" (step 2403).

In FIG. 21 showing an example, the export processing unit acquires that the watching/listening time limit information flag 150 designates that "watching/listening time limit is present" and the body watching/listening time period matching flag 151 designates "matching" from the license information of the export in the content guide metafile 100 to acquire "48 hours" from the playback watching/listening allowable time limit 149 and make display as "watching/listening time period of the contents is 48 hours after export".

A value to be set here may be set as a time after export, and a time subtracting the watching/listening time may also be set when already watching/listening the contents on the receiver device. For example, in the case of already watching/listening the contents for three hours on the receiver device, a message "the watching/listening time period of the contents is 45 hours after export" may be displayed because of 48 hours–3 hours=45 hours.

In FIG. 22 showing an example, the export processing unit executes to display, as an example, such that the watching/listening time limit information flag 150 designates that "watching/listening time limit is present" and the body watching/listening time period matching flag 151 designates "not matching" (step 2404). The export processing unit acquires "2010.1.1 1:00" from the output destination watching/listening time period 152 in the license information of the export in the content guide metafile 100 to make it display such that "the watching/listening time limit of exported contents is 2010 year, 1 month, 1 date, 1:00".

As mentioned above, the format of watching/listening time period described in the output destination watching/listening time period 152 or playback watching/listening allowable time limit 149 is different, therefore, the display for message varies.

After the export, how many times of allowable export is displayed on the basis of the information for the export allowable times 145. This is a part of "remaining times of export for contents becomes nine when executing the export".

Further, the export processing unit makes also display information of whether the transcode is allowable in accordance with the information of transcode flag 153. A message "recording mode is changed to be able to store" is an example of the case where the transcode is allowable.

Figure 23:
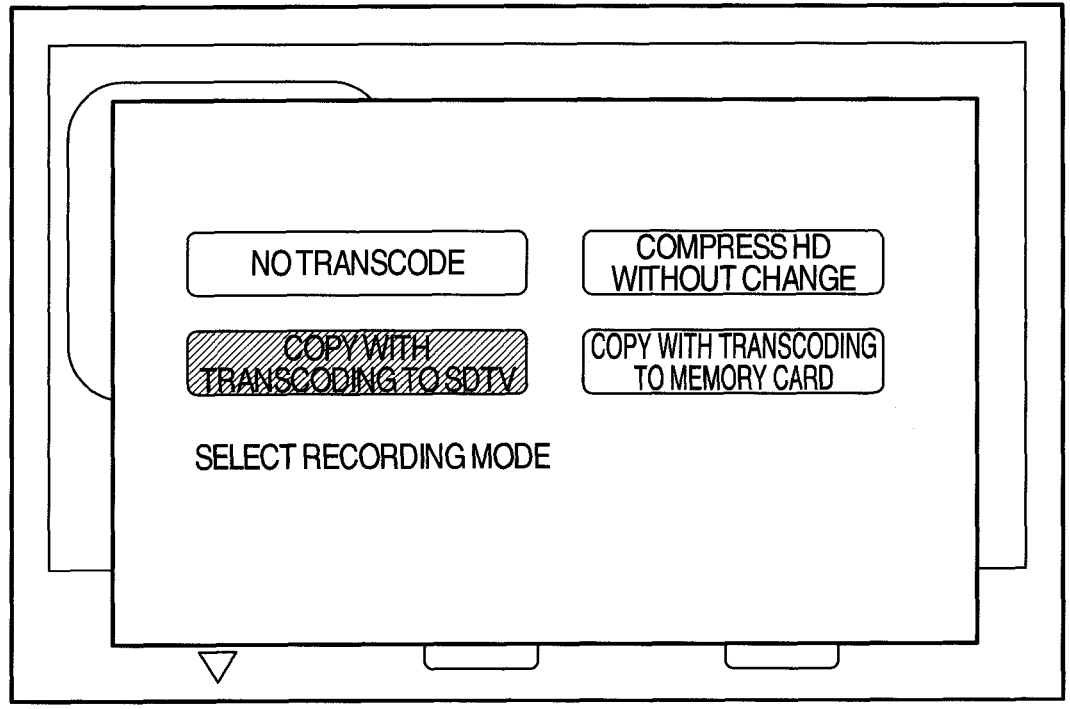
FIG. 23 is an example of an export recording mode change screen of the receiver device.

The export processing unit accepts the menu selection for the recording mode change in the menu selection (step 1909) on the screen to make display an option of the recording mode as shown in FIG. 23 (step 1910). The recording mode is selected (step 1911) to be returned to the export condition display screen in FIG. 21 or FIG. 22. It can be considered that, as an example of the option for the recording mode, there are "no transcode" which means that the transcoding is not executed at all, "compress HD without change" which means that a compression is executed without lowering the resolution of the contents on HDTV, "copy with transcoding to SDTV" which means that the compression is executed by lowering the resolution to SDTV, "copy with transcoding to memory card" which means that the resolution and bit rate are further lowered to compress for the watching/listening on a mobile device by using a memory card, etc.

In addition, HD means high definition, and SD means standard definition.

An execution is selected on the menu (step 1909) to start the export. The processing from steps 1008 to 1016 is the same as those in FIG. 6 and FIG. 16 of the first embodiment.

FIG. 6 shows the embodiment which sets the copy allowable times of arbitrary number to be able to execute the export, however, as shown in FIG. 19, the export processing unit in the receiver device 3 can also execute the export without exchanging with the license copyright management server. Definitely, it can also be configured that the exchange is executed with the license copyright management server, as shown in FIG. 6, to execute the acquisition of the export license.

The recording control unit 32 sets the copyright management information and content cryptographic key in the external output or medium on the basis of the copyright protection system of the output destination (step 1014).

FIG. 16 is an example of the export processing to the removable medium. This is a detail of the step 1014 in the flowchart of FIG. 19 similar to FIG. 6.

The recording control unit 32 secures a management information storing area of the copyright protection contents in the security memory 57 and an area for storing actual video content data in HDD 55 if there is a necessary free area for writing the export contents in the tamper resistant area (security memory 57) and normal storage medium (HDD 55) (step 2001).

The recording control unit 32 then generates the copyright content management information for an iVDR copyright management system of the export contents, that is, the copyright management information, such as an initial address of the area on HDD 55, secured as area for storing the actual video content data; the cryptographic key of the copyright protection system of iVDR 31 used for when storing encrypted contents of that; and the copy count, age count, etc. for the contents, to write in and store in the secured management information storing area for the copyright protection contents (step 2002).

Here, the copyright management information to be written contains the copy times in the export destination, watching/listening time period information, etc., and this is set by the recording control unit 32 in accordance with the usage condition information 323 for the designated medium described in the export license.

The recording control unit 32 secures the management information storing area of the copyright protection contents and an area for storing the actual video content data if there is a free area necessary for writing the export contents.

The recording control unit 32 generates the copyright content management information for the copyright management system of the removable medium for the export contents, that is, the copyright management information, such as the initial address of the area secured as an area for storing the actual video content data; the cryptographic key of the copyright protection system of the removable medium used for when storing encrypted contents of that; the copy count, age count, watching/listening time period information, etc. for the contents, to write in and store in the secured management information storing area of the copyright protection contents.

Here, the watching/listening time period information to be set is the same as that shown in FIG. 21 and FIG. 22, and the watching/listening time period designates an equal to or less than 48 hours in FIG. 21, and 2010 year, 1 month, 1 date, 1:00 in FIG. 22, as an example.

At this time, the copy allowable times appended to the export contents is transcoded to a format in accordance with the format of copy count information to be used in the copy times management function of iVDR by the export processing unit to generate as one of the copyright management information of the contents and store in iVDR.

In FIG. 11 showing an example, the export processing unit acquires the copy allowable times information designating that the contents has the right of the copy of nine times+move of once, which is transcoded to a format in accordance with the format of copy count information used in the copy times management information in iVDR. Thereafter, the recording management unit 32 writes and stores the copy count information in the management information storing area of the copyright protection contents in iVDR.

Thereafter, the export processing unit decodes the encrypted data of the video contents read out from the HDD 16 by using the cryptographic key of the export license stored in the export license hold buffer 400 (step 2003). The recording control unit 32 applies a cipher by using the cryptographic key depending on the copyright protection system of iVDR 31 storing the decoded contents as one piece of the management data of the contents in the tamper resistant area to write in an address area as a storing place of the contents (step 2004).

As mentioned above, the export contents, as the contents data along with the copyright management system of iVDR, can be copied to iVDR 31 as an export destination.

The description has been concerned with iVDR as an example shown in FIG. 16, which is not limited thereto. The removable medium may be capable of recording in the format which can manage the copyright of iVDR, BD disk, SD card, flash memory, SSD (Solid State Drive), etc. and of magnetic disk, magnetic optical disk, etc. In this case, the interface in FIG. 15 should be corresponded to the respective medium.

The export processing unit deletes the license information being stored in the export license hold buffer if the export is succeeded (steps 1015, 1016).

A CPU 50 in the removable medium 31 acquires the watching/listening time limit information from the management information storing area of the copyright protection contents in the security memory 57 to check whether the watching/listening time limit is over. The CPU 50 turns the contents to a defective playback if the watching/listening time limit is over. A method of turning the contents to the defective playback is that the CPU 50 deletes the contents stored in HDD 55. Alternatively, the CPU 50 deletes the cryptographic key to be used for decoding the contents stored in the management information storing area of the copyright protection contents in the security memory 57.

In this case, it is required to acquire the time information for collating with the watching/listening time limit information, however, it may be configured that the removable medium 32 has a clock unit for independently generating the time information. Further, when the removable medium 32 is coupled with the receiver device 3 or other device (cellular phone, TV set, computer, etc.), the CPU 50 may also acquire the time information from these devices. By comparing the acquired item information with the watching/listening time limit information, CPU 50 determines whether the watching/listening time limit is over. In addition, the above-mentioned processing may be executed by the security unit 56, other than CPU 50.

The CPU 20 in the receiver device 3 coupled with the removable medium 31 or the recording control unit 32 may turn the contents to the defective playback, other than CPU 50 in the removable medium 31 and security unit 56. In this case, CPU 20 in the receiver device 3 or recording control unit 32 deletes the contents stored in HDD 55 in a condition where the removable medium 31 is coupled therewith. The CPU 20 or recording control unit 32 also deletes the cryptographic key to be used for decoding the contents stored in the management information storing area of the copyright protection contents in the security memory 57.

According to this embodiment, the user checks expressly the usage time period of the contents to be able to use it on the basis of the metadata, when exporting the contents appended with the usage time period.

In the case of operating to match the usage time period of the body watching/listening with that of the export destination medium, the metadata for the body watching/listening is shared with that in the export to use them, so that the metadata volume can be deleted.

In addition, in this embodiment, it has been configured that the export processing unit executes the processing for the export and the receiving control unit 32 executes the write etc. in the removable medium, however, the export processing unit may execute the processing of recording control unit 32. The recording control unit 32 may also execute the processing of the export processing unit.

Embodiment 3

The following description will be concerned with another configuration example of a download-compatible receiving device providing the export function described in the first and second embodiment.

FIG. 33 shows the export function to be realized in a third embodiment. A simplicity export is that the content is output to the removable medium or external interface for the export allowable times stated in the purchase agreement to generate a copy. In the removable medium or device coupled with the external interface, the copied contents are managed by the copyright protection function possessed in the copy destination.

In an extended export function, an arbitrary plural number of times within the export allowable times stated in the purchase agreement is appended to one actual contents as the copy time management information. The export function appended with the copy times to be output of the export and the time limit information of the export stated in the purchase agreement are appended, as time limit management information, to the removable medium or device coupled with external interface. The export function appended with the usage time limit to be output of the export is assumed to the removable medium or the device coupled with the external interface.

Figure 25:
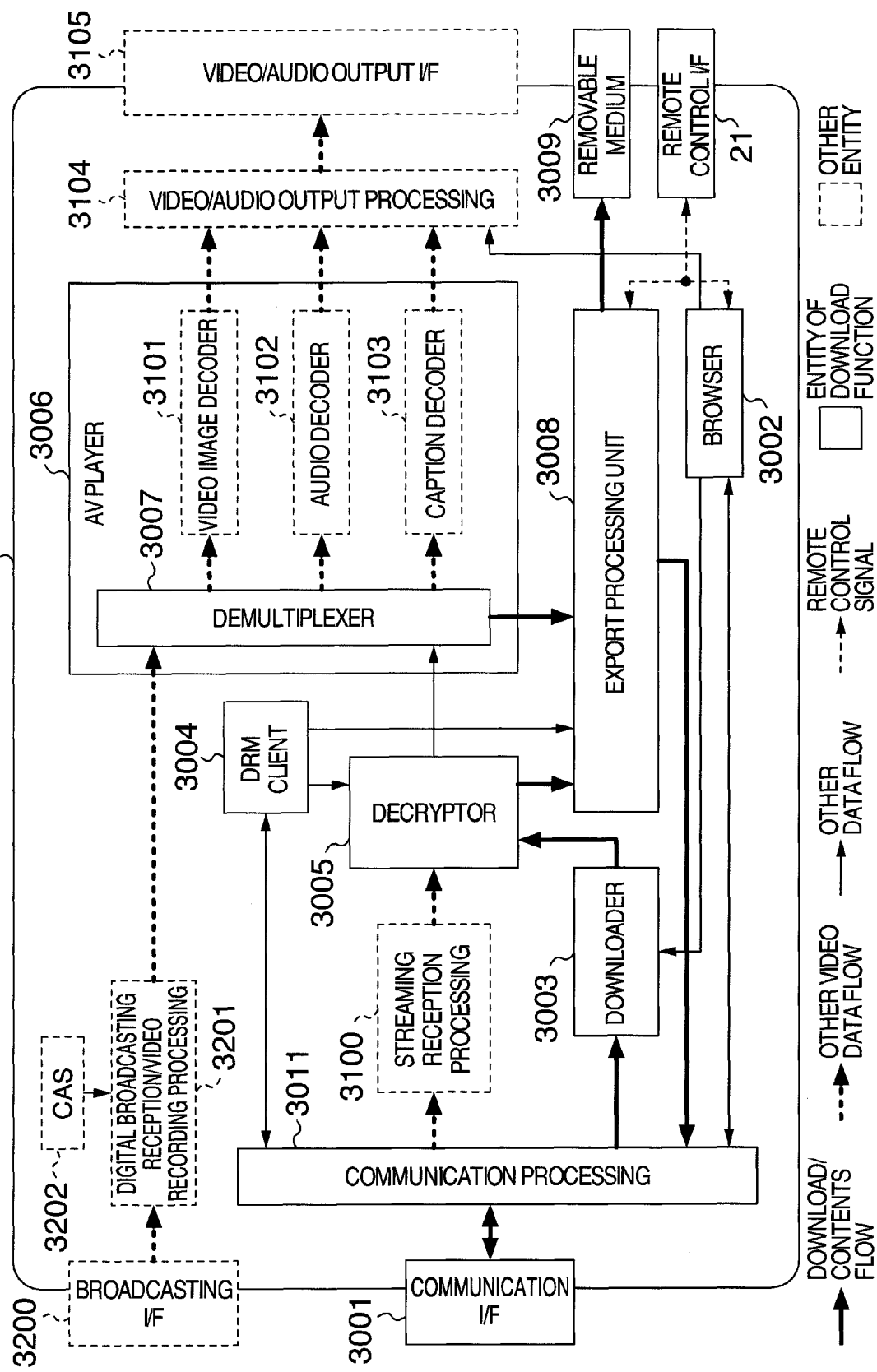
FIG. 25 is a diagram showing a system configuration example of the service server for providing the content delivery service to the network-compatible home electrical appliance via a network.

Next, FIG. 25 shows a configuration diagram of the network-compatible receiver device in this embodiment. A receiver device 3000 is physically coupled with IP network and provides a communication processing unit 3011 for executing the processing for various IP communication protocol, such as TCP (Transmission Control Protocol), UDP (User Datagram Protocol), DHCP (Dynamic Host Configuration Protocol), DNS (Domain Name Server), HTTP (Hyper Text Transfer Protocol), etc. via a communication I/F 3001 for transmitting and receiving IP (Internet Protocol) data packets.

A downloader 3003 is a processing unit for executing the processing to acquire the contents and information associated with the contents. A DRM client 3004 manages the copyright of the contents and provides a function for controlling the watching/listening and copy of the contents in response to the purchased condition of the contents. A decryptor 3005 is a processing unit for decoding the contents to be downloaded, on the basis of a designation from the DRM client 3004. An export processing unit 3008 is a processing unit for executing the output of contents to the external device coupled via a removable medium 3009 coupled with receiving device 3000, a communication processing unit 3010 and the communication I/F 3001.

The removable medium is a removable storage medium accessible via a removable medium I/F provided in the export processing unit.

The receiving device 3000 provides a remote control I/F 21 for the operation similarly shown in FIG. 2.

The receiving device 3000 provides possibly together with a function for receiving a streaming delivery service of the video/audio contents in on-demand manner. In this case, a processing unit called as a streaming reception processing unit 3100 is provided for processing the video/audio contents in a real time reception, via the communication I/F 3001.

An AV player 3006 is a processing unit for decoding the downloaded contents, stream delivered contents or broadcast received contents to be transformed to a video and audio signal.

The AV player 3006 has a demultiplexer 3007 therein, and this processing unit separates the contents decoded by the decryptor 3005 to the packets of the video, audio and caption to send these packets to a video decoder 3101, an audio decoder 3102 and a caption decoder 3103. In consequence, a video/audio output processing unit 3104 transforms to the integrated video/audio signal. This video/audio signal is output to outside from the receiver device 3000 via a video/audio output I/F 3105.

For this reason, the user can watch/listen to the contents made up of the video/audio by coupling to a TV set etc.

In addition, the video/audio output processing unit 3104 and video/audio output I/F 3105 can be considered as an interface of HDMI (registered trademark) standard for such that the video/audio is processed integrally and outputting from there, however, it is assumed to employ a video composite signal output and an analog audio output in such that the video and audio are processed independently to separately output to the outside.

Further, the receiver device 3000 sometimes provides together with a function for executing a reception and video recording of the digital broadcast. In this case, the receiver device 3000 has a so-called processing unit, such as a broadcast I/F 3200 for receiving the broadcast radio wave, a digital broadcast reception/video recording processing unit 3201 for decoding the digital broadcast signal to be transformed into a video and audio stream and CAS (Conditional Access System) 3202 for processing the copyright protection when decoding the digital broadcast signal.

Figure 27:
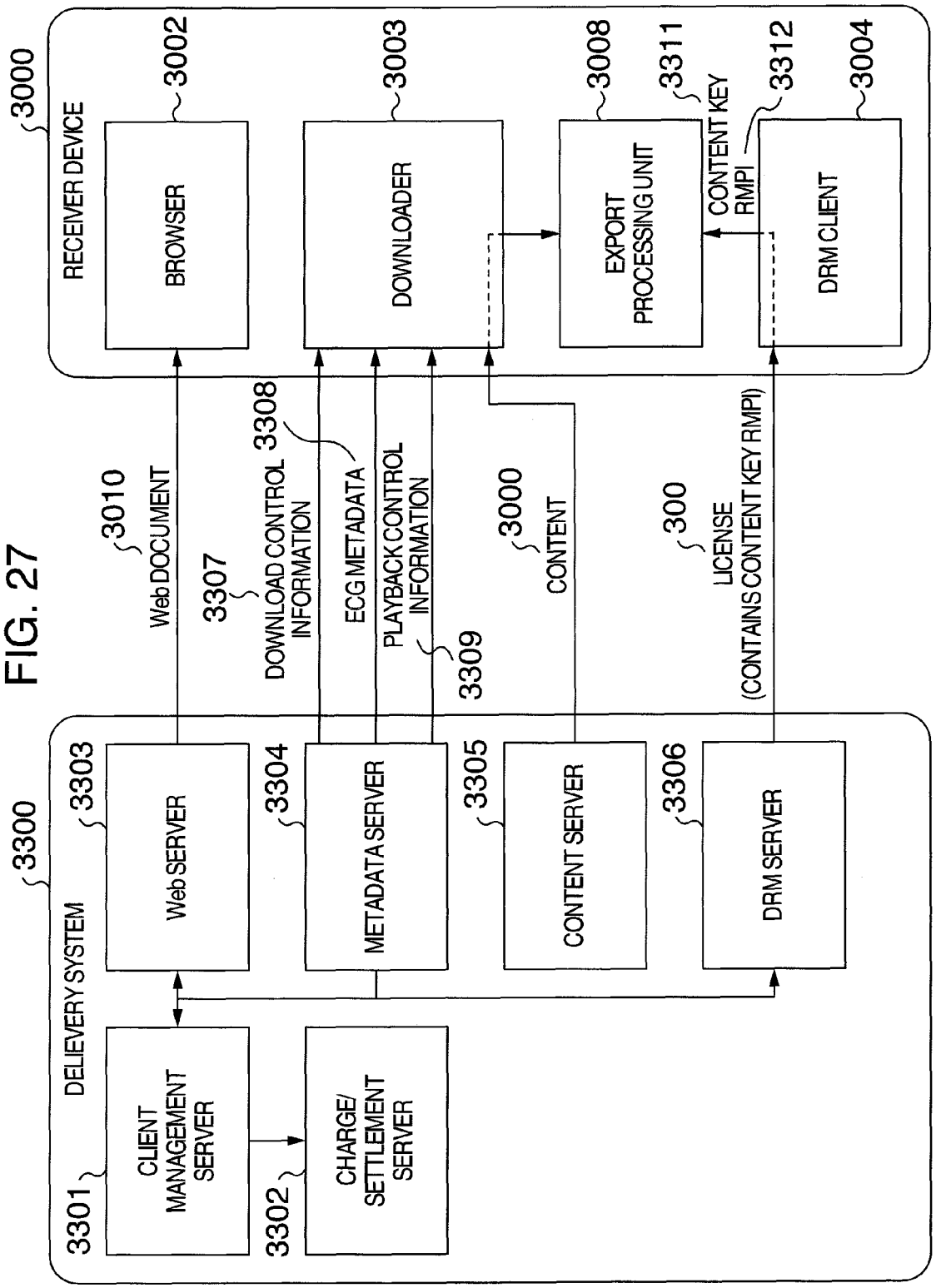
FIG. 27 is a diagram showing a relation between the receiver device and delivery system.

The following description will be concerned, in FIG. 27, with a data reception relationship of the receiver device 3000 in the system configuration in FIG. 25 and a content delivery system 3300, in the download delivery service.

FIG. 27 only illustrates a block for executing the data reception in the delivery system, extracted from the receiver device 3000 in FIG. 25.

The content delivery system 3300 is configured by a Web server 3303 for delivering a Web contents, a download control information 3307 having the contents to be downloaded, a location of the contents associated information and attribute information, an ECG metadata 3308 corresponding to the content guide metafile 100 designated in the first embodiment, a metadata server 3304 for delivering playback control information 3309 corresponding to the playback control metafile 100, a content server 3305 for delivering the content body, a DRM server 3306 for delivering the license 300 containing information, such as the contents usage right and a key necessary for decoding the contents required for use, a client management server 3301 for managing client information of the delivery service, a charge/settlement server 3302 for executing a charge and settlement processing for the contents regarding the client, etc.

In addition, the respective servers in the delivery system 3300 are shown consistently as a model for descriptive purpose. In an actual delivery system, plural types of server may be integrated to one server as actual configuration. In contrast, it may be configured that the server used for delivering plural types of data, as metadata server 3304, is divided into the actual servers classified as data type.

The delivery system 3300 and receiver device 3000 are coupled with IP network. In consequence, the communication in response to a purpose can be executed by the various protocols specified on the IP network.

The receiver device 3000 is operated along with the remote control signal received from the remote control I/F 21 by the user.

Figure 26:
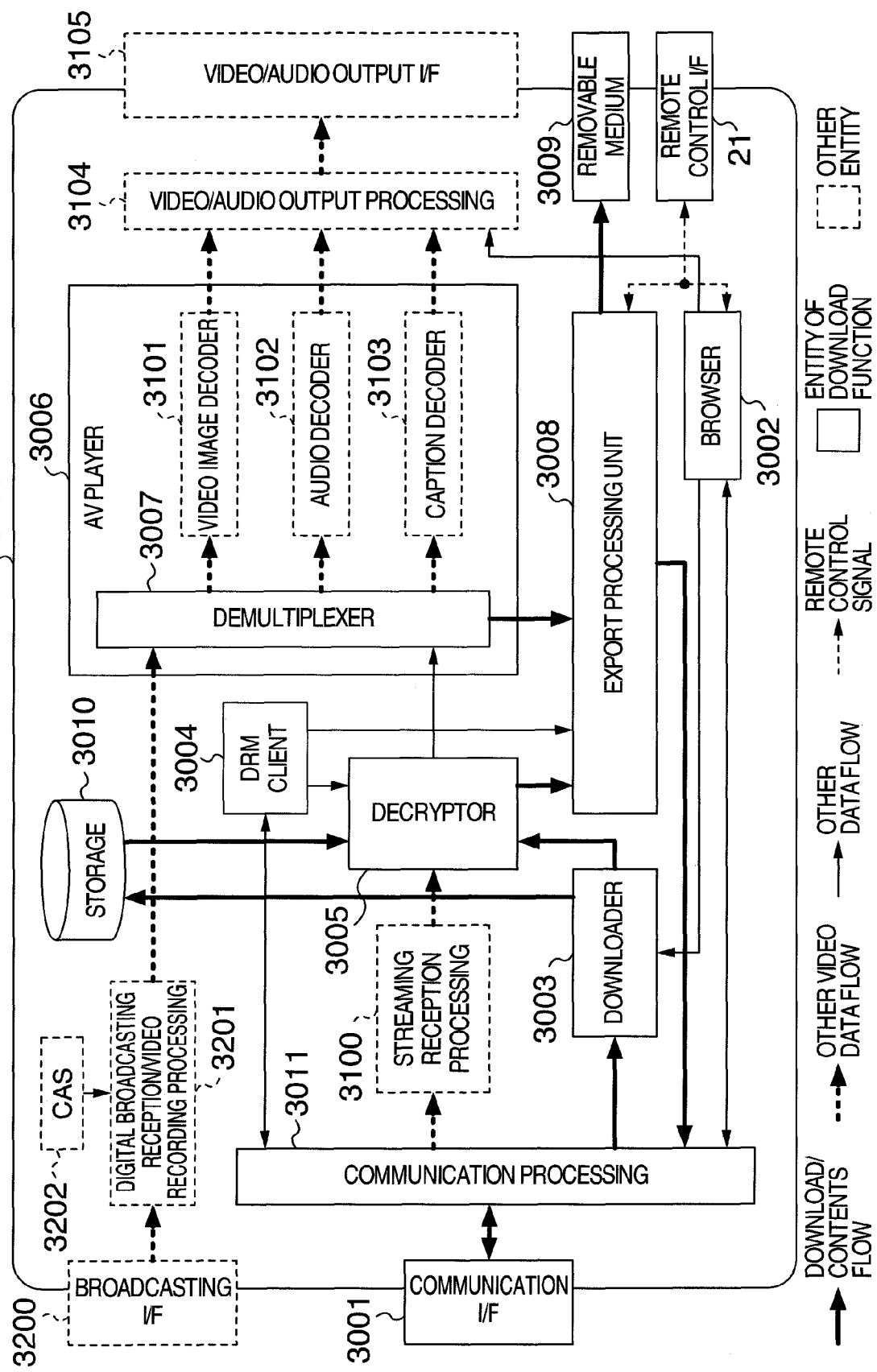
FIG. 26 is a diagram showing a system configuration example of the service server for providing the content delivery service to the network-compatible home electrical appliance via a network.

A configuration example, such as receiver device 3000 in FIG. 26 in which the storage 3010 such as HDD etc. is added to the receiver device 3000 in FIG. 25, is also assumed as another similar embodiment.

In the receiver device 3000 shown in FIG. 25, the downloaded contents are output directly to the export processing unit 3008 and also to the removable medium 3009 etc. Therefore, in the receiver device 3000, the export can be executed to the removable medium even without having the storage medium, such as HDD. In this way, it is possible to realize the export processing even by an inexpensive receiving device.

Even in the receiver device 3300 in FIG. 27, the same processing as that of the receiver device 3000 may be executed. In this case, since the downloaded contents can be exported to the removable medium from the export processing unit even when the receiver device has the storage such as HDD, it is unnecessary to store the contents in the storage, therefore, there is an advantage that the download can be executed even when there is no free area in the storage recording capacity.

As another embodiment, the contents are once stored in the storage 3010 without decoding the downloaded contents. When the contents stored in the storage is played back or exported to the removable medium 3009 etc., it can considered that the DRM client 3004 acquires the license 300 from the DRM server 3306, and the decryptor 3005 decodes the contents on the basis of a content key 3311 written in the license 300, as an example.

In the playback of contents, the contents decoded by the decryptor 3005 are separated into the packets of the video, audio and caption data by the demultiplexer 3007, and the video/audio decoded by the video decoder 3101, audio decoder 3102 and caption decoder 3103 is output to the outside via the video/audio output I/F 3105, therefore, the user can watch/listen to the contents.

In the export of contents, the contents decoded by the decryptor 3005 is sent to the export processing unit 3008 to output to the removable medium 3009 etc.

Figure 28:
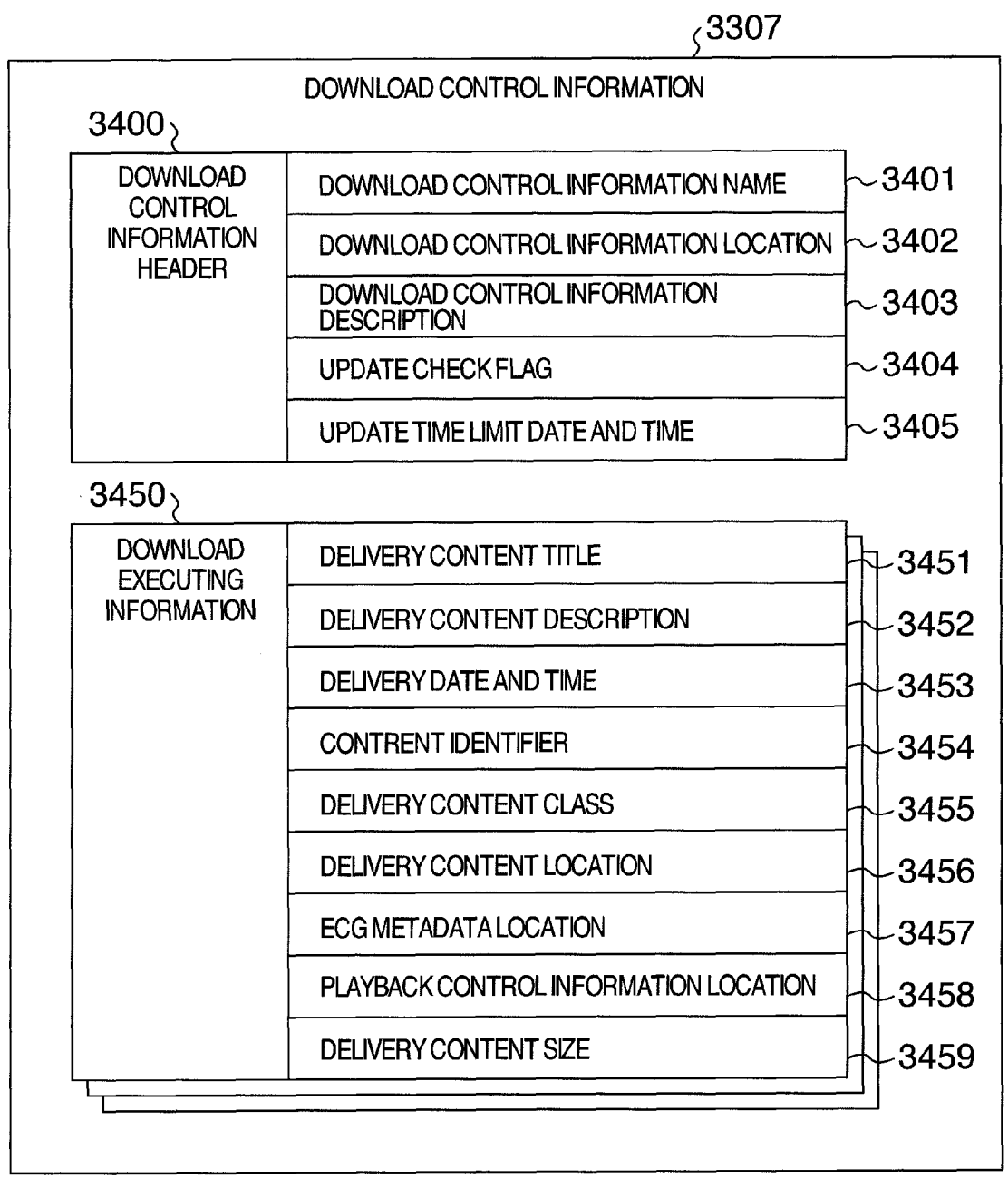
FIG. 28 is a configuration example of a download control metafile.

The configuration of download control information 3307 acquired from the metadata server 3304 is shown in FIG. 28 when a browser 3002 designates the download of contents.

The download control information 3307 contains a download control information header 3400 having the contents of metafile itself and download execution information 3450 used for downloading one or plural number of contents.

The download control information 3307 is written by RSS, for example. The download control information can be generated (prepared) for arbitrary plural number of contents in certain packages, but the plural packages have no straddle. It is also possible that the plural number is prepared for a certain package. In this regard, it is necessarily prepared that all of the contents in the package can be downloaded. The download control information 3307 is sometimes updated, and the receiver device is checked for a constant time period to update a difference. In addition, in the case of RSS, the respective contents are identified uniquely by enclosure URL.

The download control information 3307 has information, such as a download control information name 3401 designating a name (for example, a download reservation name, file name, ID, etc.) of the corresponding download control information 3307; a download control information location 3402 designating a location (for example, URL on Internet Web site providing the download reservation, an address may be acceptable other than URL, and hereinafter, the location is the same point of view) of the corresponding download control information 3307; a description text 3403 of the download control information indicating a description (for example, description, language type, etc. for the download reservation) of the corresponding download control information 3307; an update check flag 3404; an update time limit date and time 3405; etc.

The update check flag 3404 determines whether the contents in the download control information 3307 on the metadata server 3304 is changed and a check is executed periodically, and takes a value for "update" means that the check is executed and for "only this case" means that the check is not executed periodically after first acquisition. The update time limit date and time 3405 is valid when the update check flag 3404 designates "update", and describes the date and time for the time limit during which the update of download control information 3307 is continued to check.

The update time limit date and time 3405 indicates a time limit for monitoring the content update. The unit (unit of date, time, minute or etc.) of time limit is arbitrary. It is possible to take a value indicating "no time limit" or continuing the check almost permanently.

As another embodiment, it can be realized that the update check flag 3404 is omitted by handling a special value (all 0, for example) of the update time limit date and time 3405 as a value indicating the "only this case" of the update check flag 3404.

Plural number of download execution information 3450 can be described in the download control information 3307. The contents to be downloaded contains: a delivery content title 3451 indicating a title (which may be a program name, file name, ID, etc.) of the contents; a delivery content description text 3452 indicating a description (features, remarks, etc.) for the contents; a delivery date and time 3453 indicating a date and time (which may be date unit, minute unit) for delivering the contents; a content identifier 3454 of the delivery contents for identifying uniquely the contents on Internet; a delivery content class 3455, a content location 3456 indicating an acquisition destination URL of the delivery contents; an ECG metadata location 3457 indicating the acquisition destination URL of ECG metadata corresponding to the contents; a playback control information location 3458 indicating the acquisition destination URL of the playback control information corresponding to the contents; a delivery content size 3459, etc.

The content identifier 3454 is described by a character string standardized by a schema referred to as CRID://, in which a part of authority is a keyword for only identifying a delivery person of the contents on Internet, and a domain name managed as a unique name on Internet is used as the authority in this embodiment. A content_id after authority/ is ID for uniquely identifying the contents in the authority, and a format of the character string may be operated freely in the authority. In the consequence of the above-mentioned operation, it is possible to uniquely identify the contents on Internet by using the content identifier 3454, therefore, it is possible to acquire targeted contents and relative metadata by accessing the content identifier 3454 as URL on Internet.

The delivery date and time 3453 is described normally as date and time at which the contents is stored in the content server 3305 and published from it, however, the contents is not published yet when delivering the download control information 3307, and a scheduled date in the future is sometimes described in the delivery date and time 3453. An updated date and time is described in the delivery date and time 3453 when the delivered contents is updated once.

The delivery content file class 3455 is described as a class, such as video, photograph, music, program, multimedia data, etc. delivered from a server, for example. The delivery content file type 3455 may also be described as a class such that the video is broken up to a movie, news, sports, etc., and the music is further broken up to a classic, rock, jazz, etc.

The delivery content metadata means annexed information required for the playback and execution of contents, as one example, including a category for the content search and keyword information, and a thumbnail, chapter information, etc. if the contents are video information.

The configuration of ECG metafile together with the contents to be acquired from the metadata server 3304 is the same as that of the content guide metafile 100 in the first or second embodiment.

The configuration of playback control metafile is also the same as that of the playback control metafile 200 in the first or second embodiment.

The configuration of license to be used in the copyright protection system using in this embodiment is the same as that of the license 300 in the first or second embodiment.

In addition, the content key 3311 contained in the license 300 corresponds to the content cryptographic key 311, 321 in the first embodiment, and RMPI (Right Management and Protection Information) 3312 corresponds to the usage condition information 323 for designated medium in the first embodiment.

The following description will be concerned with a processing to be executed in the respective blocks in this embodiment.

Figure 29:
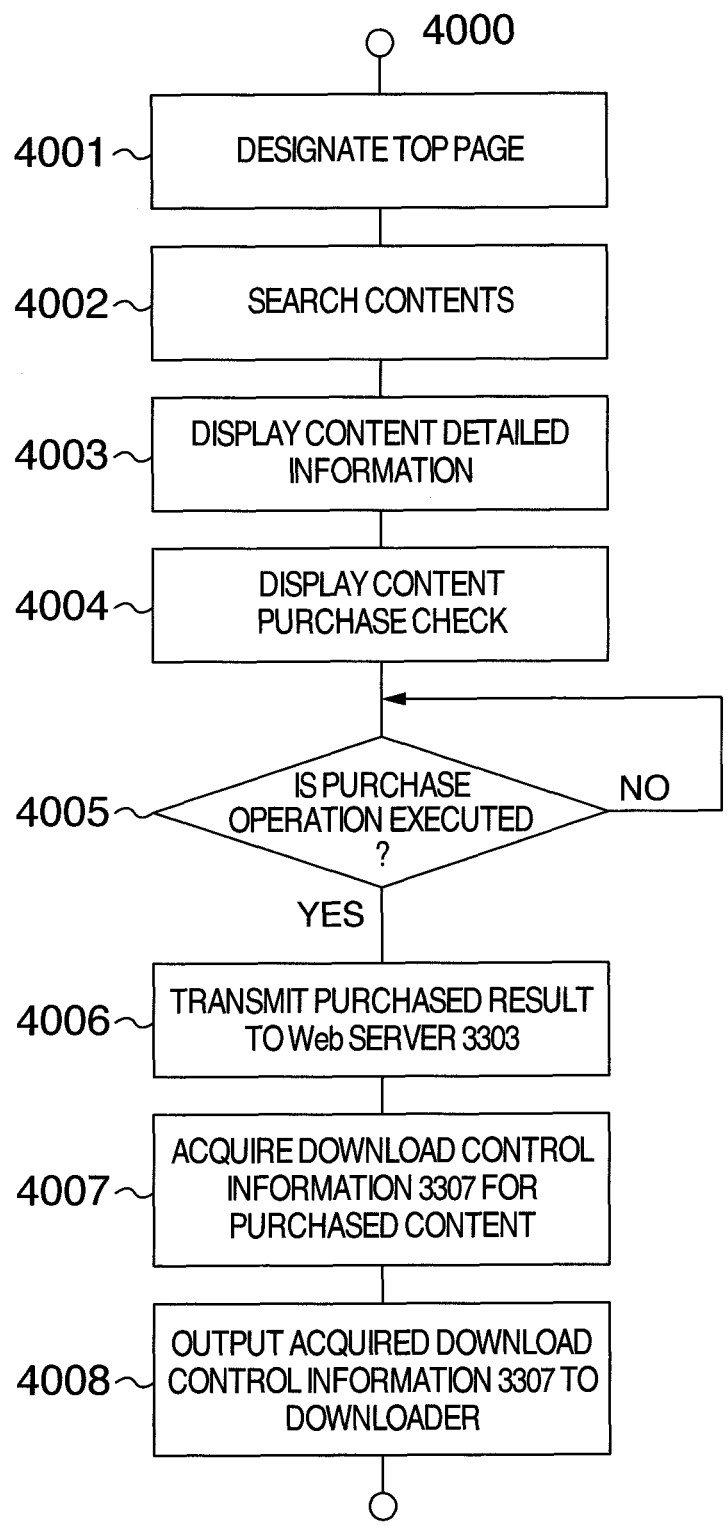
FIG. 29 is a processing flow example of Web contents on a browser.

FIG. 29 is a processing flow 4000, as an example, of Web contents to be executed on the browser 3002.

The browser 3002 is actuated by operating the remote control 30 from the user to acquire the Web contents on a top page from the Web server 3303 (step 4001). The search for contents is executed by the user's operation (step 4002) to find out the contents to be seen, and display a purchase condition, such as detail information of the contents, price, watching/listening time limit, number of copy, etc. (step 4003). A purchase operation is executed (step 4005) on a purchase check screen (step 4004) to reply (step 4006) a purchased result to the Web server 3303.

Subsequently, the content download control information 3307, which is purchased, is acquired (step 4007) from the metadata server 3304, designated as an acquisition destination by the Web contents, and the acquired download control information 3307 is output to the downloader (step 4008).

The Web server 3303 received the purchased result transfers that result to the client management server 3301 at the step 4006, and the client management server 3301 identifies the receiver device 3000 executed the purchase operation or the user using the receiver device 3000 to execute a purchase processing of the contents and designate the issuance of license for the DRM server. At the same time, the charge/settlement server 3302 receives a request for a charge processing to execute the settlement of fee.

Figure 30:
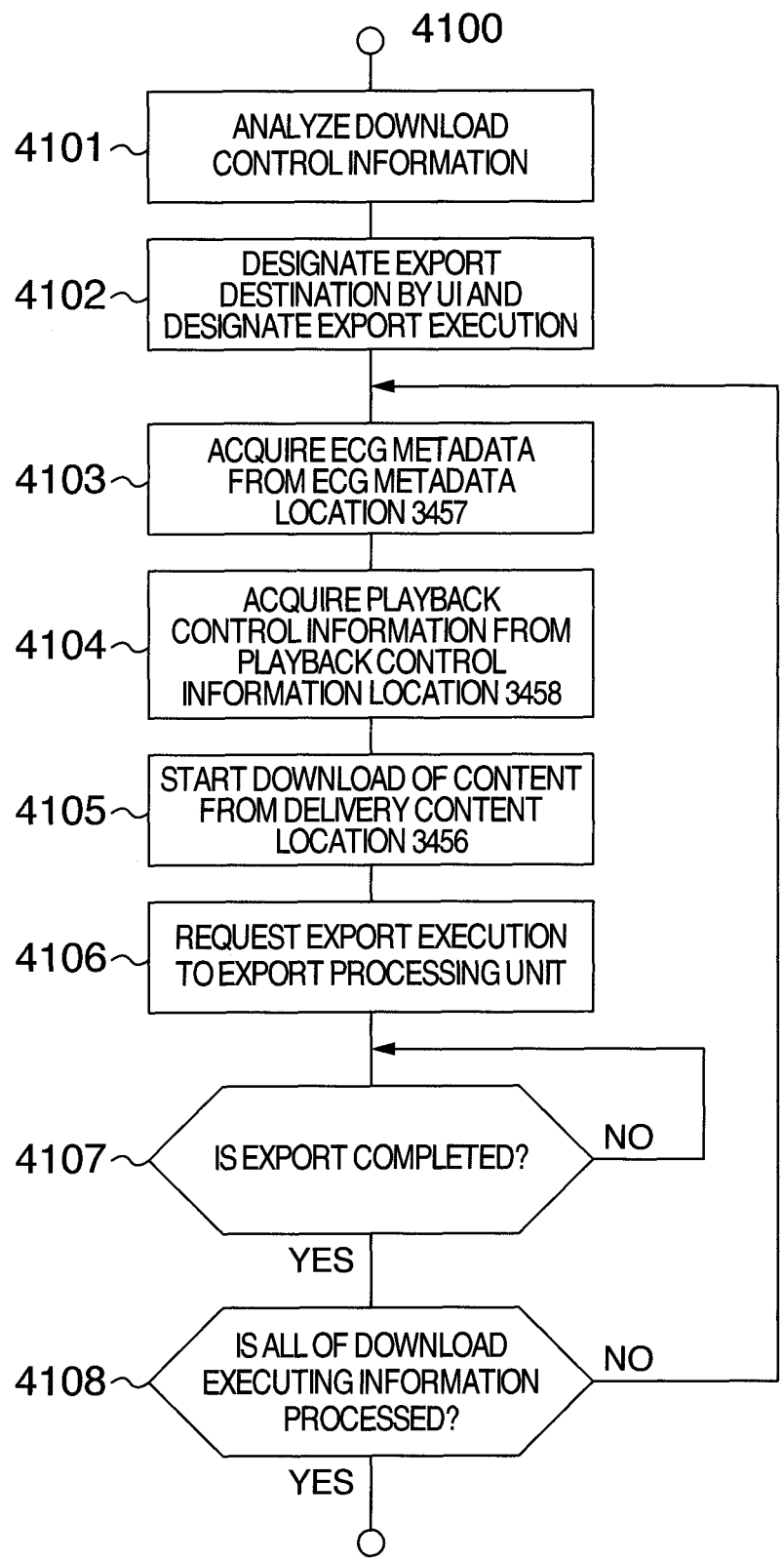
FIG. 30 is a processing flow example of a downloader.
Figure 31:
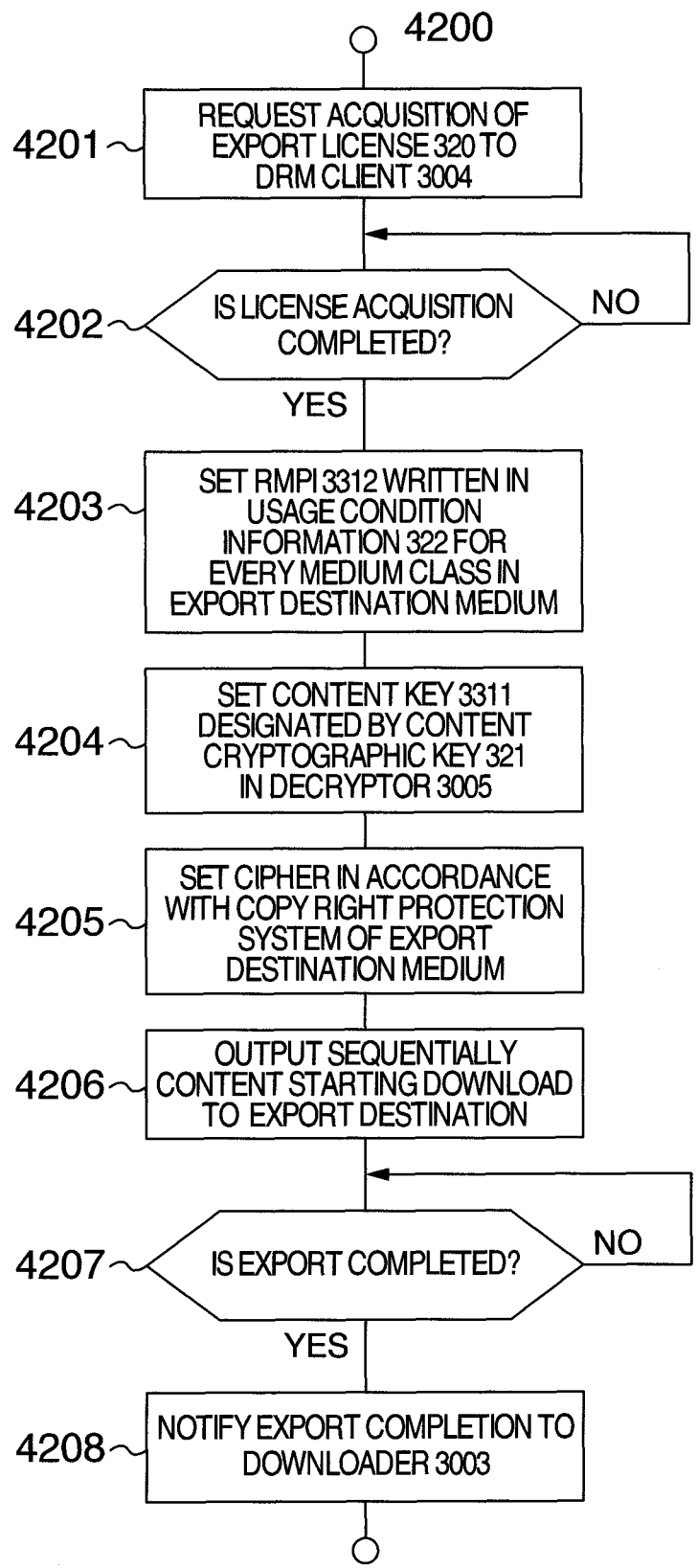
FIG. 31 is a processing flow example of the export processing unit.

FIG. 30 is a processing flow 4100 of the downloader 3003.

The downloader 3003 receives the download control information 3307 from the browser 3002 to make the user, designate the export destination by the remote control unit 30 and screen display and designate the user to execute the export (step 4102), after analyzing the download control information 3307 (step 4101). The designation of export destination may be omitted if there is one export destination.

Next, the ECG metadata 3308 is acquired (step 4103) from URL written in the ECG metadata location 3457 written in the download control information 3307, and the playback control information 3309 is acquired (step 4104) from URL written in the playback control information location 3458 to request (step 4105) the start of download of the contents for URL written in the delivery content location 3456. When the content begins to come from the content server 3305, the execution for export is requested to the export processing unit 3308 to sequentially output (step 4106) the contents received from the content server 3305 to the export processing unit 3308.

If the export processing unit 3308 completes (step 4107) all the export for contents, the download is completed for one contents. When plural download execution information 3450 is present in the download control information 3307, the processing from the steps 4102 to 4107 is repeated by the plural number of times.

When the download for one content is only executed, the export for one content is ended to immediately complete the processing of downloader 3003 since the download execution information 3450 is only written as one.

In this example, the download control information 3307, playback control information 3309 and contents, as appended to the contents, are acquired sequentially in the order, however, this order may be changed depending on the implementation. In the case of executing plural communication sessions between the servers and of the system to be able to execute plural communications in parallel, the receiver device may acquire simultaneously the download control information 3307, playback control information 3309 and contents in parallel. The receiver device may also execute plural downloads in parallel when plural download execution information 3450 is present.

In this example, the processing method is described such that the browser 3302 acquires the download control information 3307 to output to the downloader 3303. However, the processing method may be such that the browser 3302 transfers only the acquisition destination URL of download control information 3307 to the downloader 3303 and the receiver device 3000 or the communication processing unit 3011. At this time, the export processing unit 3008 executes the copyright protection processing and the cipher for contents in response to the output destination, necessary for the output to the removable medium and external device, in accordance with the information having output requirements, such as RMPI 3312 described in the license 300.

A detailed operation of the export processing 3008 in the receiver device is the same as that shown in FIG. 6, FIG. 7, FIG. 8, FIG. 9, FIG. 10, FIG. 11, FIG. 12 and FIG. 13 in the first embodiment, or FIG. 19, FIG. 20, FIG. 21, FIG. 22, FIG. 23 and FIG. 24 in the second embodiment.

In contrast, a detailed operation regarding the export destination medium is the same as that described in the first embodiment or the second embodiment shown in FIG. 15 and FIG. 16.

In addition, this apparatus is not limited to the above-mentioned embodiments but may contain various modifications. For example, the above-mentioned embodiments have described in detail for clearly explaining this product but not explaining for all of the configurations. A part of the configuration in one embodiment can be replaced with that in the other embodiment, and one configuration can also be added to the other. Further, one part of the configuration in the respective embodiments can be added, deleted or replaced with the other part thereof.

A part or all of the above-mentioned configurations, functions, etc. may be realized by hardware designed with an integrated circuit, for example. The above-mentioned configurations, functions, etc. may also be realized by software for interpreting and executing programs for executing the functions by a processor. At the time of executing the functions, information, such as corresponding programs, tables, files, etc., can be stored in a memory or cache memory, such as RAM 23, ROM 24, etc. At the time of non-execution, the information, such as corresponding programs, tables, files, etc., for realizing the functions, can be stored in the memory such as RAM 23, ROM 24, etc., hard disk device 16 or an IC card device, etc.

The control lines and information lines have designated as required for the explanation, and all of them are unnecessarily designated for the product. Practically, all of configurations may be coupled with each other.

REFERENCE SIGNS LIST 1 content delivery server
2 copyright management server
3 receiver device (IP TV set)
4 network
5 IP network-compatible storage device
11 antenna/tuner
12 descrambler
13 demultiplexer
14 video/audio decoder
15 media recording control unit
16 hard disk
17 hard disk drive
18 display screen
19 speaker
20 CPU
21 remote control interface
22 IP (Internet protocol) communication interface unit
23 random-access memory
24 read-only memory
25 graphic/audio engine
26 video display control unit
27 audio output control unit
28 real time clock
29 iVDR/DVD/BD interface drive unit
30 remote control
31 iVDR/BD/DVD disk
32 recording control unit
50 CPU
51 Serial Advanced Technology Attachment interface
52 cipher unit 53 buffer memory
54 system memory
55 hard disk
56 security unit
57 security memory
58 iVDR connector

The invention claimed is:

1. A content receiver apparatus comprising:
a download microprocessor that executes download of contents;
a storage memory that stores the downloaded contents;
a license information acquiring microprocessor that acquires output license information describing output requirements of the contents;
an output microprocessor that executes output of the contents to an external storage medium, by export after recording the contents, or by direct export;
a meta-information acquiring unit that acquires meta-information having output times information showing times which can output the contents to the storage medium;
characterized in that:
the output license information has usage conditions information indicating usage conditions of the contents in an output destination;
in the case of the export after recording, the download microprocessor stores the downloaded contents in the storage memory; the output microprocessor outputs the contents stored in the storage memory to the external storage medium; acquires the usage conditions information from the output license information for the contents; and sets the acquired usage conditions information in a management information storing area in the external storage medium;
in the case of the direct export, the output microprocessor outputs the downloaded contents by the download microprocessor to the external storage medium, without storing in the storing memory; the output microprocessor acquires the usage conditions information from the output license information for the contents and sets the acquired usage conditions information in a management information storing area in the external storage medium;
the output license information has, as the usage conditions information, usage time limit information indicating usage time limit of the contents in an output destination;
the output microprocessor executes output of the contents, on times indicated in the output times information, and sets the usage time limit information acquired from the output license information, and times corresponding to the output times information acquired from the meta-information in a management information storing area in the external storage medium.

2. The content receiver apparatus according to claim 1, characterized in that:
in the case of the export after recording, when the output microprocessor outputs the contents from the storage memory to the external storage medium, the license information acquiring microprocessor acquires the output license information;
in the case of the direct export, when the download microprocessor downloads the contents, the license information acquiring microprocessor acquires the output license information.

3. The content receiver apparatus according to claim 1, characterized in that:
the output license information has, as the usage conditions information, usage time limit information indicating usage time limit of the contents in an output destination;
the output microprocessor acquires the usage time limit information from the output license information, and sets the acquired usage time limit information, in a management information storing area in the external storage medium.

4. The content receiver apparatus according to claim 1, characterized in that:
the output microprocessor acquires the output times information from the meta-information, and sets times corresponding to the acquired output times information in a management information storing area in the external storage medium.

5. A content output method for a content receiver apparatus comprising:
executing download of contents;
storing the downloaded contents in a storage memory;
acquiring output license information describing output requirements of the contents;
outputting the contents to an external storage medium, by export after recording the contents, or by direct export;
acquiring meta-information having output times information showing times which can output the contents to the storage medium;
characterized in that:
the output license information has usage conditions information indicating usage conditions of the contents in an output destination;
in the case of the export after recording, storing the downloaded contents in the storage unit; outputting the stored contents in the storage memory to the external storage medium, acquiring the usage conditions information from the output license information for the contents, and setting the acquired usage conditions information in a management information storing area in the external storage medium;
in the case of the direct export, outputting the downloaded contents, without storing in the storage memory, and acquiring usage conditions information from the output license information for the contents, setting the acquired usage conditions information in a management information storing area in the external storage medium;
the output license information has, as the usage conditions information, usage time limit information indicating usage time limit of the contents in an output destination;
executing output of the contents, based on times indicated in the output times information, and setting the usage time limit information acquired from the output license information, and times corresponding to the output times information acquired from the meta-information in a management information storing area in the external storage medium.

6. The content output method according to claim 5, characterized in that:
in the case of the export after recording, when outputting the contents from the storage unit to the external storage medium, acquiring the output license information;
in the case of the direct export, when downloading the contents, acquiring the output license information.

7. The content output method according to claim 5, characterized in that:
the output license information has, as the usage conditions information, usage time limit information indicating usage time limit of the contents in an output destination;

acquiring the usage time limit information from the output license information, and setting the acquired usage time limit information in a management information storing area in the external storage medium.

8. The content output method according to claim 5, further comprising
acquiring the output times information from the meta-information, and setting times corresponding to the acquired output times information in a management information storing area in the external storage medium.

* * * * *